(12) United States Patent
Suzuki

(10) Patent No.: US 6,298,086 B1
(45) Date of Patent: *Oct. 2, 2001

(54) MOTION VECTOR DETECTING APPARATUS

(75) Inventor: Mitsuyoshi Suzuki, Tokyo (JP)

(73) Assignee: Mitsubishi Denki Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/217,983

(22) Filed: Dec. 22, 1998

(30) Foreign Application Priority Data

Jul. 22, 1998 (JP) ................................. 10-206729

(51) Int. Cl.$^7$ ................................................. H04N 7/12
(52) U.S. Cl. ............................... 375/240.16; 375/240.17; 348/699
(58) Field of Search ..................... 375/240.16, 240.17; 348/402.1, 407.1, 413.1, 416.1, 699, 700; 382/236, 238; 386/109, 111

(56) References Cited

U.S. PATENT DOCUMENTS

| | | | |
|---|---|---|---|
| 5,142,361 | * 8/1992 | Tayama et al. | 348/416 |
| 5,587,741 | * 12/1996 | Kim | 348/416 |
| 5,949,486 | * 9/1999 | Ishihara et al. | 348/402 |
| 6,072,833 | * 6/2000 | Yamauchi | 375/240 |
| 6,125,141 | * 9/2000 | Sato et al. | 375/240 |

FOREIGN PATENT DOCUMENTS

| | | | |
|---|---|---|---|
| 6-113290 | 4/1994 | (JP) | H04N/7/12 |
| 9-298751 | 11/1997 | (JP) | H04N/7/32 |
| 9298751 | 11/1997 | (JP) | H04N/7/32 |

OTHER PUBLICATIONS

Chan et al. "New adaptive pixel decimation for block motion vector estimation", IEEE Transaction on Circuits and Systems for Video Technology, vol. 6, No. 1, pp. 113–118, Feb. 1996.*

Chan et al, "A block motion vector estimation using pattern based pixel decimation", IEEE International Symposium on Circuits and Systems, vol. 2, pp. 1153–1156, Jun. 1997.*

* cited by examiner

*Primary Examiner*—Vu Le
(74) *Attorney, Agent, or Firm*—Leydig, Voit & Mayer, Ltd.

(57) ABSTRACT

In a motion vector detecting apparatus, pixel data in a search block located away from the position of a reference block by a search vector is selected from pixel data in a coded frame as pixel data to be compared with pixel data in the reference block. Further, the search block is moved in horizontal and vertical directions.

7 Claims, 30 Drawing Sheets

MEMORY 11-(I,J)

| ADDRESS | (0, 0) | (1, 0) | ... | (0, 1) | ... |
|---|---|---|---|---|---|
| 0 | (24, 24) | (25, 24) | ... | (24, 25) | ... |
| 1 | (32, 24) | (33, 24) | ... | (32, 25) | ... |
| 2 | (40, 24) | (41, 24) | ... | (40, 25) | ... |
| ⋮ | | | | | |
| 8 | (24, 32) | (25, 32) | ... | (24, 33) | ... |
| 9 | (32, 32) | (33, 32) | ... | (32, 33) | ... |
| ⋮ | | | | | |

FIG.9A

| ROW \ COLUMN | 0 | 1 | 2 | 3 | 4 | 5 | 6 | 7 |
|---|---|---|---|---|---|---|---|---|
| 0 | (72,32) | (73,32) | (74,32) | (75,32) | (76,32) | (69,32) | (70,32) | (71,32) |
| 1 | (72,33) | (73,33) | (74,33) | (75,33) | (76,33) | (69,33) | (70,33) | (71,33) |
| 2 | (72,26) | (73,26) | (74,26) | (75,26) | (76,26) | (69,26) | (70,26) | (71,26) |
| 3 | (72,27) | (73,27) | (74,27) | (75,27) | (76,27) | (69,27) | (70,27) | (71,27) |
| 4 | (72,28) | (73,28) | (74,28) | (75,28) | (76,28) | (69,28) | (70,28) | (71,28) |
| 5 | (72,29) | (73,29) | (74,29) | (75,29) | (76,29) | (69,29) | (70,29) | (71,29) |
| 6 | (72,30) | (73,30) | (74,30) | (75,30) | (76,30) | (69,30) | (70,30) | (71,30) |
| 7 | (72,31) | (73,31) | (74,31) | (75,31) | (76,31) | (69,31) | (70,31) | (71,31) |

FIG.9B

| ROW \ COLUMN | 0 | 1 | 2 | 3 | 4 | 5 | 6 | 7 |
|---|---|---|---|---|---|---|---|---|
| 0 | (69,32) | (70,32) | (71,32) | (72,32) | (73,32) | (74,32) | (75,32) | (76,32) |
| 1 | (69,33) | (70,33) | (71,33) | (72,33) | (73,33) | (74,33) | (75,33) | (76,33) |
| 2 | (69,26) | (70,26) | (71,26) | (72,26) | (73,26) | (74,26) | (75,26) | (76,26) |
| 3 | (69,27) | (70,27) | (71,27) | (72,27) | (73,27) | (74,27) | (75,27) | (76,27) |
| 4 | (69,28) | (70,28) | (71,28) | (72,28) | (73,28) | (74,28) | (75,28) | (76,28) |
| 5 | (69,29) | (70,29) | (71,29) | (72,29) | (73,29) | (74,29) | (75,29) | (76,29) |
| 6 | (69,30) | (70,30) | (71,30) | (72,30) | (73,30) | (74,30) | (75,30) | (76,30) |
| 7 | (69,31) | (70,31) | (71,31) | (72,31) | (73,31) | (74,31) | (75,31) | (76,31) |

FIG.9C

| ROW \ COLUMN | 0 | 1 | 2 | 3 | 4 | 5 | 6 | 7 |
|---|---|---|---|---|---|---|---|---|
| 0 | (69,26) | (70,26) | (71,26) | (72,26) | (73,26) | (74,26) | (75,26) | (76,26) |
| 1 | (69,27) | (70,27) | (71,27) | (72,27) | (73,27) | (74,27) | (75,27) | (76,27) |
| 2 | (69,28) | (70,28) | (71,28) | (72,28) | (73,28) | (74,28) | (75,28) | (76,28) |
| 3 | (69,29) | (70,29) | (71,29) | (72,29) | (73,29) | (74,29) | (75,29) | (76,29) |
| 4 | (69,30) | (70,30) | (71,30) | (72,30) | (73,30) | (74,30) | (75,30) | (76,30) |
| 5 | (69,31) | (70,31) | (71,31) | (72,31) | (73,31) | (74,31) | (75,31) | (76,31) |
| 6 | (69,32) | (70,32) | (71,32) | (72,32) | (73,32) | (74,32) | (75,32) | (76,32) |
| 7 | (69,33) | (70,33) | (71,33) | (72,33) | (73,33) | (74,33) | (75,33) | (76,33) |

FIG.9D

| ROW \ COLUMN | 0 | 1 | 2 | 3 | 4 | 5 | 6 | 7 |
|---|---|---|---|---|---|---|---|---|
| 0 | (48,40) | (49,40) | (50,40) | (51,40) | (52,40) | (53,40) | (54,40) | (55,40) |
| 1 | (48,41) | (49,41) | (50,41) | (51,41) | (52,41) | (53,41) | (54,41) | (55,41) |
| 2 | (48,42) | (49,42) | (50,42) | (51,42) | (52,42) | (53,42) | (54,42) | (55,42) |
| 3 | (48,43) | (49,43) | (50,43) | (51,43) | (52,43) | (53,43) | (54,43) | (55,43) |
| 4 | (48,44) | (49,44) | (50,44) | (51,44) | (52,44) | (53,44) | (54,44) | (55,44) |
| 5 | (48,45) | (49,45) | (50,45) | (51,45) | (52,45) | (53,45) | (54,45) | (55,45) |
| 6 | (48,46) | (49,46) | (50,46) | (51,46) | (52,46) | (53,46) | (54,46) | (55,46) |
| 7 | (48,47) | (49,47) | (50,47) | (51,47) | (52,47) | (53,47) | (54,47) | (55,47) |

FIG.17

HORIZONTAL ADDRESS q →

VERTICAL ADDRESS r ↓

|   | 0 | 1 | 2 | 3 |
|---|---|---|---|---|
| 0 | 00 10 20 30<br>01 11 21 31<br>02 12 22 32<br>03 13 23 33 | 00 10 20 30<br>01 11 21 31<br>02 12 22 32<br>03 13 23 33 | 00 10 20 30<br>01 11 21 31<br>02 12 22 32<br>03 13 23 33 | 00 10 20 30<br>01 11 21 31<br>02 12 22 32<br>03 13 23 33 |
| 1 | 00 10 20 30<br>01 11 21 31<br>02 12 22 32<br>03 13 23 33 | 00 10 20 30<br>01 11 21 31<br>02 12 22 32<br>03 13 23 33 | 00 10 20 30<br>01 11 21 31<br>02 12 22 32<br>03 13 23 33 | 00 10 20 30<br>01 11 21 31<br>02 12 22 32<br>03 13 23 33 |
| 2 | 00 10 20 30<br>01 11 21 31<br>02 12 22 32<br>03 13 23 33 | 00 10 20 30<br>01 11 21 31<br>02 12 22 32<br>03 13 23 33 | 00 10 20 30<br>01 11 21 31<br>02 12 22 32<br>03 13 23 33 | 00 10 20 30<br>01 11 21 31<br>02 12 22 32<br>03 13 23 33 |
| 3 | 00 10 20 30<br>01 11 21 31<br>02 12 22 32<br>03 13 23 33 | 00 10 20 30<br>01 11 21 31<br>02 12 22 32<br>03 13 23 33 | 00 10 20 30<br>01 11 21 31<br>02 12 22 32<br>03 13 23 33 | 00 10 20 30<br>01 11 21 31<br>02 12 22 32<br>03 13 23 33 |

SEARCH BLOCK
(16 PIXELS × 16 PIXELS)

SEARCH DIVIDED-BLOCK
(4 PIXELS × 4 PIXELS)

MOTION VECTOR DETECTING APPARATUS

BACKGROUND OF THE INVENTION

1. Field of the Invention

The present invention relates to a motion vector detecting apparatus suitable for use in an image processing system such as an H. 261 system, an MPEG (Moving Picture Experts Group) system or the like, wherein a motion vector relative to an already-coded frame is detected for each of blocks into which a frame of image data is divided.

2. Description of the Prior Art

FIG. 33 is a block diagram showing a motion vector detecting apparatus according to a conventional example 1 described in, for example, JP-A No. 6-113290. In the drawing, reference numeral 1 indicates an already-coded frame memory which is employed in an image processing system such as an H. 261 system, an MPEG system or the like and stores therein pixel data of a frame already coded by interframe prediction coding, i.e., pixel data for prediction of a frame coded at the present time. Upon prediction of the frame coded at the present time, a motion vector relative to each of blocks into which the coded frame is divided, is detected. Namely, horizontal and vertical distances between the position of each block in the frame coded at the present time and the position of a range corresponding to each block in the already-coded frame are detected as a motion vector.

Reference numerals 101-J (where J=0, ..., 7) respectively indicate search window row memories for respectively storing pixel data lying in a row shifted by a column component of a predetermined search vector from the position of each of blocks in a search window corresponding to a range for searching a range corresponding to each block in the coded frame. The coded frame will be divided into blocks of 8 rows and 8 columns herein. Further, the search window will be defined as a range set when the blocks are respectively shifted from side to side by 16 pixels at maximum and shifted upward and downward by 8 pixels at maximum. Incidentally, the search vector represents horizontal and vertical distances from the position of each block referred to above to a range of pixel data to be compared with pixel data in the block. Here, the search vector corresponds to any of (−16, −8) through (+16, +8).

Reference numeral 102 indicates a search window shift register unit having shift registers constructed so that registers 103-(0, J) through 103-(7, J) are series-connected to their corresponding search window row memories 101-J by the number of columns.

Reference numeral 5 indicates a coded frame memory for storing data about pixels in a frame coded at the present time. Reference numeral 6 indicates a reference register unit for allowing registers 12-(I, J) to store data about respective pixels of Ith rows and Jth columns (where I=0, ..., 7, and J=0, ..., 7) in any (hereinafter called "reference block") of blocks of 8 rows and 8 columns, into which the frame coded at the present time is divided. Incidentally, pixels extending from the mth row and nth column to the (m+7)th row and (n+7)th column in the frame constitute each reference block.

Reference numeral 4 indicates an evaluation unit having pixel comparators 13-(I, J) for respectively comparing the pixel data of the respective registers 12-(I, J) of the reference register unit 6 and the pixel data of the registers 103-(I, J) constituting the shift registers of the search window shift register unit 102.

Reference numeral 7 indicates a motion vector detection unit for detecting the optimum search vector as a motion vector, based on the results of comparisons by the respective pixel comparators 13-(I, J) of the evaluation unit 4. For example, the differences between the respective two pixel data are calculated by the respective pixel comparators 13-(I, J) and a search vector at the time that the sum of absolute values of their differences is minimum, is defined as a motion vector.

The operation will next be described.

First, the already-coded frame memory 1 supplies any pixel data of 8 rows of the search window to their corresponding search window row memories 101-0 through 101-7.

Thereafter, the search window row memories 101-0 through 101-7 output pixel data constituting one-row pixel data supplied thereto to their corresponding registers 103-(0, 0) through 103-(0, 7) of the search window shift register unit 102 in order for each clock.

The respective registers 103-(I, J) of the search window shift register unit 102 supply the stored pixel data to the next-stage registers 103-(I+1, J) and the pixel comparators 13-(I, J) of the evaluation unit 4 for each clock and store the pixel data supplied from the pre-stage registers 103-(I−1, J) or the search window row memories 101-J therein during one clock, respectively. Incidentally, the registers 103-(7,J) supply pixel data to the pixel comparators 13-(I, J) of the evaluation unit 4 alone. Namely, pixel data lying in a range of 8 rows and 8 columns moved in the horizontal direction by one pixel for each clock, of pixel data of jth to (j+7)th columns in the frame and lying within the search window are supplied to the evaluation unit 4.

On the other hand, the coded frame memory 5 allows the registers 12-(0, 0) through 12-(7, 7) of the reference register unit 6 to store pixel data in any of the blocks into which the coded frame is divided.

Further, the registers 12-(0, 0) through 12-(7, 7) of the reference register unit 6 supply the pixel data thereof to the pixel comparators 13-(0, 0) through 13-(7, 7) of the evaluation unit 4 for each clock, respectively.

The pixel comparators 13-(I, J) of the evaluation unit 4 calculate the differences between the pixel data from the registers 103-(I, J) of the search window shift register unit 102 and the pixel data from the registers 12-(I, J) of the reference register unit 6 and supply their differences to the motion vector detection unit 7.

The motion vector detection unit 7 stores the difference between a position vector in a frame, of a predetermined pixel of a reference block and a position vector of each pixel in the already-coded frame to be compared with the predetermined pixel therein as a search vector together with the sum of the absolute values of their pixel data, which corresponds to an evaluation value.

When, for example, the position in the frame, of a pixel at the upper-left corner of the reference block is given as (m, n) and the position in the frame, of the pixel data supplied to the search window row memory 101-0 is given as (m−16, j) through (m+16, j), the search vector changes from (−16, j−n) to (+16, j−n).

Thus, the pixel data in the range of 8 rows and 8 columns, of the pixel data whose positions in the frame are given as (m−16, j) through (m+16, j+7), which pixel data being included in the pixel data in the already-coded frame, are compared with pixel data which constitute each block given by (m, n) through (m+7, n+7). Further, the above-described processing is performed on a range of (n−8)th to (n−1)th rows, a range of (n−7)th to nth rows, ..., a range of (n+8)th to (n+15)th rows in the already-coded frame. Thereafter, the motion vector detection unit 7 outputs a search vector at the time that the aforementioned evaluation value is minimum, to unillustrated devices or circuits or the like as a motion vector.

Incidentally, an apparatus described in JP-A No. 9-298751 and the like are known as ones related to the present invention. However, they do not disclose the feature of the invention of the present application.

Thus, the motion vector detecting apparatus according to the conventional example 1 has a problem in that since the range to be compared with the reference block is shifted in either one of the horizontal and vertical directions so as to search all the ranges in the search window in order to detect the motion vector, a long time is required till the detection of the motion vector.

The motion vector detecting apparatus according to the conventional example 1 has another problem in that since the evaluation unit needs to have the pixel comparators of the same number as the number of pixels in the reference block, it encounters difficulties in reducing a circuit scale so as to lower the cost of the motion vector detecting apparatus.

The motion vector detecting apparatus according to the conventional example 1 has a further problem in that since it is necessary to compare all the pixels in the reference block with the pixel data in the already-coded frame, it has a difficulty in detecting motion vectors relative to all the blocks with efficiency.

The motion vector detecting apparatus according to the conventional example 1 has a still further problem in that since the comparisons between the pixel data in the pixel units are executed, it is difficult to perform comparisons between the pixel data in finer units such as semi-pixel units or the like.

SUMMARY OF THE INVENTION

The present invention has been made to solve the above-described problems. It is therefore an object of the present invention to obtain or achieve a motion vector detecting apparatus which selects pixel data in a search block at a position away from the position of a reference block by a search vector, of pixel data in a coded frame, as pixel data to be compared with pixel data in the reference block and moves the search block in two horizontal and vertical directions, thereby making it possible to detect a range highly correlating with the pixel data in the reference block within a search window with efficiency and detect a motion vector in a short time.

It is another object of the present invention to achieve a motion vector detecting apparatus which performs comparisons between pixel data every divided blocks obtained by dividing a reference block into a predetermined number to reduce the number of pixel comparators of an evaluation unit, thereby making it possible to reduce a circuit scale and the cost of the motion vector detecting apparatus.

It is a further object of the present invention to achieve a motion vector detecting apparatus which compares pixel data obtained by thinning pixel data constituting a reference block of a frame coded at the present time at a predetermined rate with pixel data thinned at the same rate, of an already-coded frame, thereby making it possible to detect motion vectors relative to all the blocks with efficiency.

It is a still further object of the present invention to achieve a motion vector detecting apparatus which calculates data lying midway between respective pixels in an already-coded frame, based on data about the pixels in the already-coded frame, and compares the intermediate data and pixel data in a reference block, thereby making it possible to perform comparisons between the pixel data in finer units such as semi-pixel units or the like.

According to a first aspect of this invention, there is provided a motion vector detecting apparatus, comprising:
  block data storing means for storing data about a predetermined number of pixels, of data about pixels constituting blocks therein;
  coded data storing means for storing therein data about pixels lying within a range of predetermined rows and predetermined columns in a coded frame as viewed from the position of each block;
  selecting means supplied with a predetermined search vector and for selecting data about pixels lying in a range identical in size to each block, at a position away from the position of the block by the search vector, from the pixel data stored in the coded data storing means;
  means for comparing the pixel data stored in the block data storing means and the pixel data selected by the selecting means; and
  means for detecting a motion vector, based on the result of comparison by the comparing means.

According to the first aspect, the motion vector detecting apparatus can obtain an advantageous effect in that since it comprises the block data storing means for storing the data about the predetermined number of pixels, of the data about the pixels constituting the blocks therein, the coded data storing means for storing therein the data about the pixels lying within the range of the predetermined rows and the predetermined columns in the coded frame as viewed from the position of each block, the selecting means supplied with the predetermined search vector and for selecting the data about the pixels lying in the range identical in size to each block, at the position away from the position of the block by the search vector, from the pixel data stored in the coded data storing means, the means for comparing the pixel data stored in the block data storing means and the pixel data selected by the selecting means, and the means for detecting the motion vector, based on the result of comparison by the comparing means, a range to be compared with each block can be shifted in two horizontal and vertical directions, a range highly correlating with pixel data in the block can be detected within the predetermined range and hence a motion vector can be detected in a short time.

According to a second aspect of this invention, there is provided a motion vector detecting apparatus, comprising:
  first storing means for storing data about pixels constituting blocks therein;
  second storing means for, when a predetermined range of a coded frame is divided into areas identical in size to each block, storing therein data about pixels in the predetermined range of the coded frame every data about pixels lying in the same rows and same columns in the post-division areas;
  selecting means supplied with a predetermined search vector and for respectively selecting any of the data about the pixels lying in the same rows and same columns in the post-division areas, the data being stored in the second storing means, and selecting data about pixels lying in a range identical in size to each block, at a position away from the position of each block by the search vector;
  means for comparing the pixel data stored in the first storing means and the pixel data selected by the selecting means every pixels; and means for detecting a motion vector, based on the result of comparison by the comparing means.

According to the second aspect, the motion vector detecting apparatus can bring about an advantageous effect in that since it comprises the first storing means for storing the data about the pixels constituting the blocks therein, the second storing means for, when the predetermined range of the coded frame is divided into the areas identical in size to each block, storing therein the data about the pixels in the predetermined range of the coded frame every data about the pixels lying in the same rows and same columns in the post-division areas, the selecting means supplied with the predetermined search vector and for respectively selecting any of the data about the pixels lying in the same rows and same columns in the post-division areas, the data being stored in the second storing means, and selecting the data about the pixels lying in the range identical in size to each block, at the position away from the position of each block by the search vector, the means for comparing the pixel data stored in the first storing means and the pixel data selected by the selecting means every pixels, and the means for detecting the motion vector, based on the result of comparison by the comparing means, a range to be compared with each lock can be moved in two horizontal and vertical directions, a range highly correlating with pixel data in the block can be detected within the predetermined range and hence a motion vector can be detected in a short time.

According to a third aspect of this invention, there is provided a motion vector detecting apparatus, comprising:

third storing means for storing therein data about pixels constituting blocks obtained by dividing each block into a predetermined number;

fourth storing means for, when a predetermined range of a coded frame is divided into areas identical in size to each divided block, storing therein data about pixels in the predetermined range of the coded frame every data about pixels lying in the same rows and same columns in the post-division areas;

selecting means supplied with a predetermined search vector and for respectively selecting any of the data about the pixels lying in the same rows and same columns in the post-division areas, the data being stored in the fourth storing means, and selecting data about pixels lying in a range identical in size to each divided block, at a position away from the position of each divided block by the search vector;

means for comparing the pixel data stored in the third storing means and the pixel data selected by the selecting means every pixels; and means for detecting a motion vector, based on the result of comparison by the comparing means.

According to the third aspect, the motion vector detecting apparatus can bring about an advantageous effect in that since it comprises the third storing means for storing therein the data about the pixels constituting the blocks obtained by dividing each block into the predetermined number, the fourth storing means for, when the predetermined range of the coded frame is divided into the areas identical in size to each divided block, storing therein the data about the pixels in the predetermined range of the coded frame every data about the pixels lying in the same rows and same columns in the post-division areas, the selecting means supplied with the predetermined search vector and for respectively selecting any of the data about the pixels lying in the same rows and same columns in the post-division areas, the data being stored in the fourth storing means, and selecting the data about the pixels lying in the range identical in size to each divided block, at the position away from the position of each divided block by the search vector, the means for comparing the pixel data stored in the third storing means and the pixel data selected by the selecting means every pixels, and the means for detecting the motion vector, based on the result of comparison by the comparing means, the comparing means can be reduced in circuit scale and the cost of the motion vector detecting apparatus can be reduced.

According to a fourth aspect of this invention, there is provided a motion vector detecting apparatus, comprising:

fifth storing means for storing therein data about pixels constituting each block, which are thinned at a predetermined rate;

sixth storing means for, when a predetermined range of a coded frame is divided into areas identical in size to each block, storing therein data about pixels in the predetermined range of the coded frame every data about pixels lying in the same rows and same columns in the post-division areas;

selecting means supplied with a predetermined search vector and for selecting any of the data about the pixels lying in the same rows and same columns in the post-division areas, the data being stored in the sixth storing means, and selecting the data about the pixels thinned at the predetermined rate, of data about pixels lying in a range identical in size to each block, at a position away from the position of each block by the search vector;

means for comparing the pixel data stored in the fifth storing means and the pixel data selected by the selecting means every pixels; and means for detecting a motion vector, based on the result of comparison by the comparing means.

According to the fourth aspect, the motion vector detecting apparatus can bring about an advantageous effect in that since it comprises the fifth storing means for storing therein the data about pixels constituting each block, which are thinned at the predetermined rate, the sixth storing means for, when the predetermined range of the coded frame is divided into the areas identical in size to each block, storing therein the data about the pixels in the predetermined range of the coded frame every data about the pixels lying in the same rows and same columns in the post-division areas, the selecting means supplied with the predetermined search vector and for selecting any of the data about the pixels lying in the same rows and same columns in the post-division areas, the data being stored in the sixth storing means, and selecting the data about the pixels thinned at the predetermined rate, of the data about the pixels lying in the range identical in size to each block, at the position away from the position of each block by the search vector, the means for comparing the pixel data stored in the fifth storing means and the pixel data selected by the selecting means every pixels, and the means for detecting the motion vector, based on the result of comparison by the comparing means, the number of times that the pixel data are compared with each other, is reduced by the thinning rate and motion vectors relative to all the blocks can be efficiently detected in a short time.

According to a fifth aspect of this invention, there is provided a motion vector detecting apparatus, comprising:

seventh storing means for storing data about pixels constituting each block therein;

eighth storing means for, when a predetermined range of a coded frame is divided into areas identical in size to each block, storing therein data about pixels in the predetermined range of the coded frame every data about pixels lying in the same rows and same columns in the post-division areas;

selecting means supplied with a predetermined search vector and for respectively selecting any of the data about the pixels lying in the same rows and same columns in the post-division areas, the data being stored in the eighth storing means, and selecting the data about the pixels in a range identical in size to each block, at a position away from the position of each block by the search vector;

intermediate data calculating means for calculating data lying midway between the respective pixels selected by the selecting means, based on the data about the selected pixels;

means for comparing the pixel data stored in the seventh storing means and the data about the pixels selected by the selecting means or the data calculated by the intermediate data calculating means; and means for detecting a motion vector, based on the result of comparison by the comparing means.

According to the fifth aspect, the motion vector detecting apparatus can bring about an advantageous effect in that since it comprises the seventh storing means for storing the data about the pixels constituting each block therein, the eighth storing means for, when the predetermined range of the coded frame is divided into the areas identical in size to each block, storing therein the data about the pixels in the predetermined range of the coded frame every data about the pixels lying in the same rows and same columns in the post-division areas, the selecting means supplied with the predetermined search vector and for respectively selecting any of the data about the pixels lying in the same rows and same columns in the post-division areas, the data being stored in the eighth storing means, and selecting the data about the pixels in the range identical in size to each block, at the position away from the position of each block by the search vector, the intermediate data calculating means for calculating data situated midway between the respective pixels selected by the selecting means, based on the data about the selected pixels, the means for comparing the pixel data stored in the seventh storing means and the data about the pixels selected by the selecting means or the data calculated by the intermediate data calculating means, and the means for detecting the motion vector, based on the result of comparison by the comparing means, comparisons between the pixel data in finer pixel units can be executed.

According to a sixth aspect of this invention, there is provided a motion vector detecting apparatus comprising means for setting a search vector according to the result of comparison by comparing means.

According to the sixth aspect, the motion vector detecting apparatus can bring about an advantageous effect in that since it comprises the means for setting the search vector according to the result of comparison by comparing means, a motion vector can be efficiently detected within a search window.

Typical ones of various inventions of the present application have been shown in brief. However, the various inventions of the present application and specific configurations of these inventions will be understood from the following description.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIGS. 9A to 9D are diagrams showing examples of coordinate values about pixel data outputted from each memory of the search window memory unit, coordinate values about pixel data outputted from each selector of the horizontal exchanger of the exchange, coordinate values about pixel data outputted from each selector of the vertical exchanger of the exchange, and coordinate values about pixel data in a reference block;

FIG. 17 is a diagram showing search divided-blocks employed in the second embodiment and horizontal and vertical addresses of the search divided-blocks;

FIG. 22 is a diagram depicting one example of a search block at the time that pixel data is thinned out to ⅛ in a third pattern;

FIG. 23 is a diagram showing one example of a search block at the time that pixel data is thinned out to 1/16 in a fourth pattern;

FIG. 30 is a diagram illustrating one example of a search divided-block employed in the fourth embodiment;

DETAILED DESCRIPTION OF THE PREFERRED EMBODIMENTS

Preferred embodiments of the present invention will hereinafter be described in detail with reference to the accompanying drawings.

First Embodiment

Figure 1:
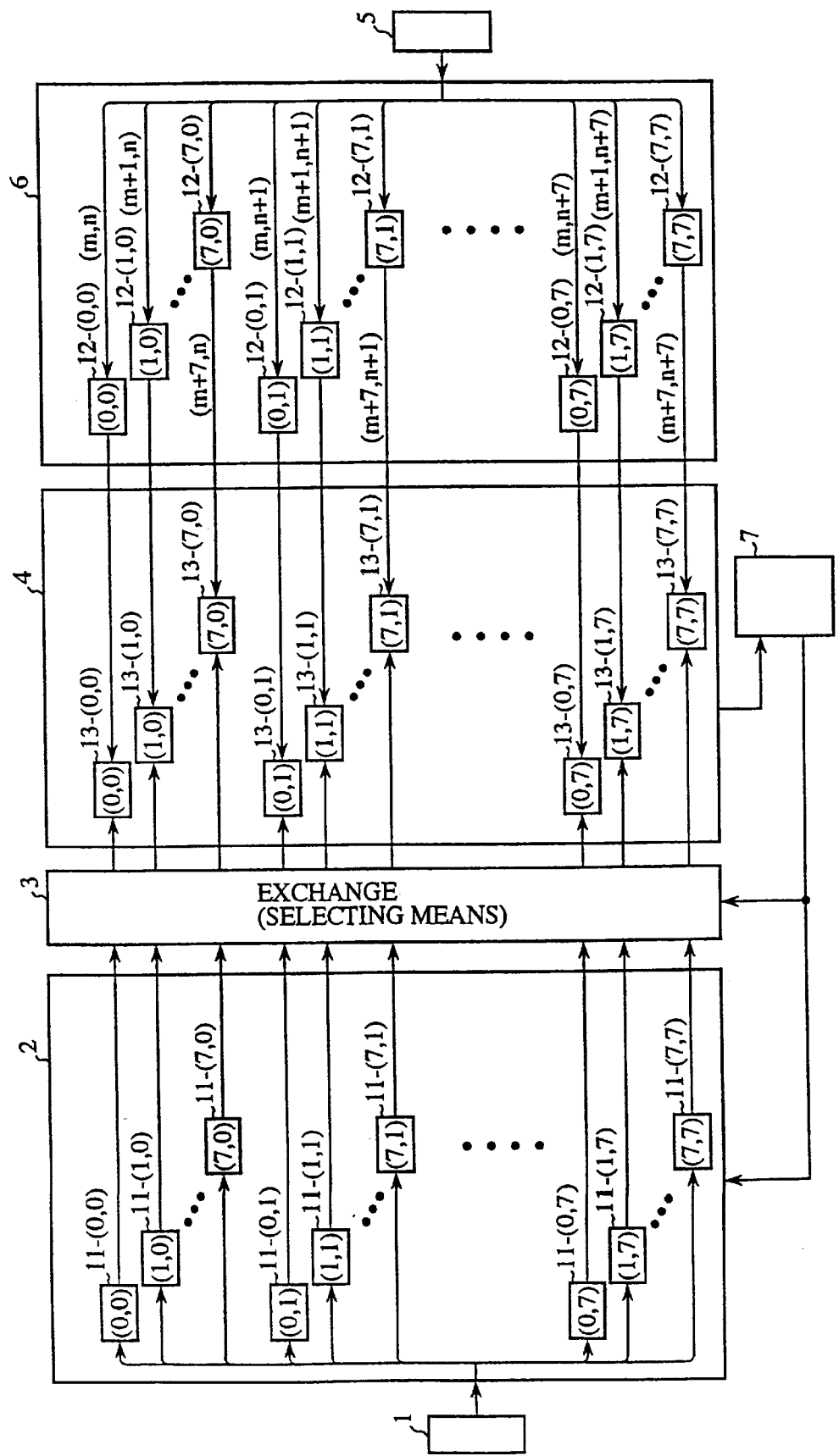
FIG. 1 is a block diagram showing a configuration of a motion vector detecting apparatus according to a first embodiment of the present invention.
Figure 2:
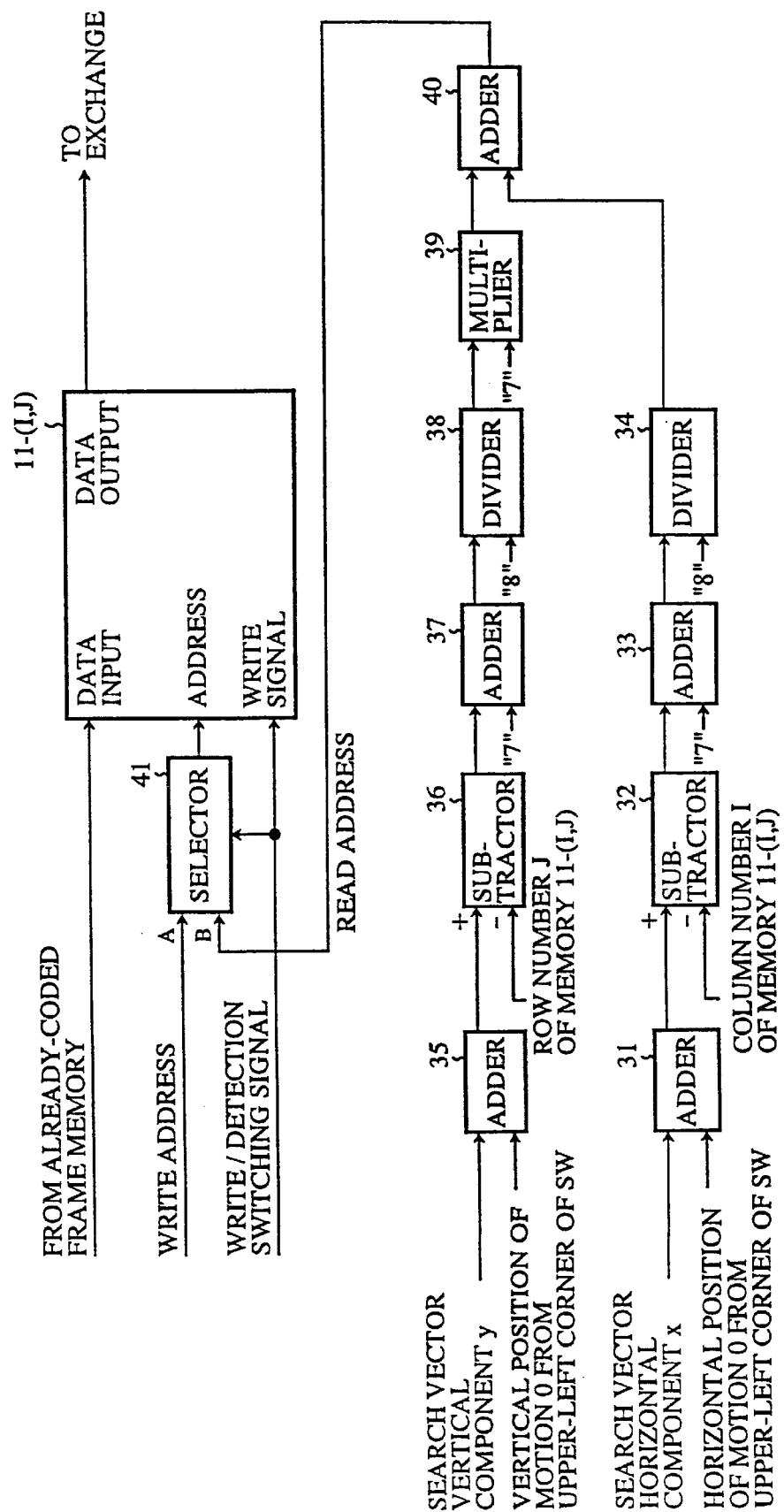
FIG. 2 is a block diagram illustrating one example of a circuit for controlling the input/output of each memory, which is included in a search window memory unit shown in FIG. 1.
Figure 3:
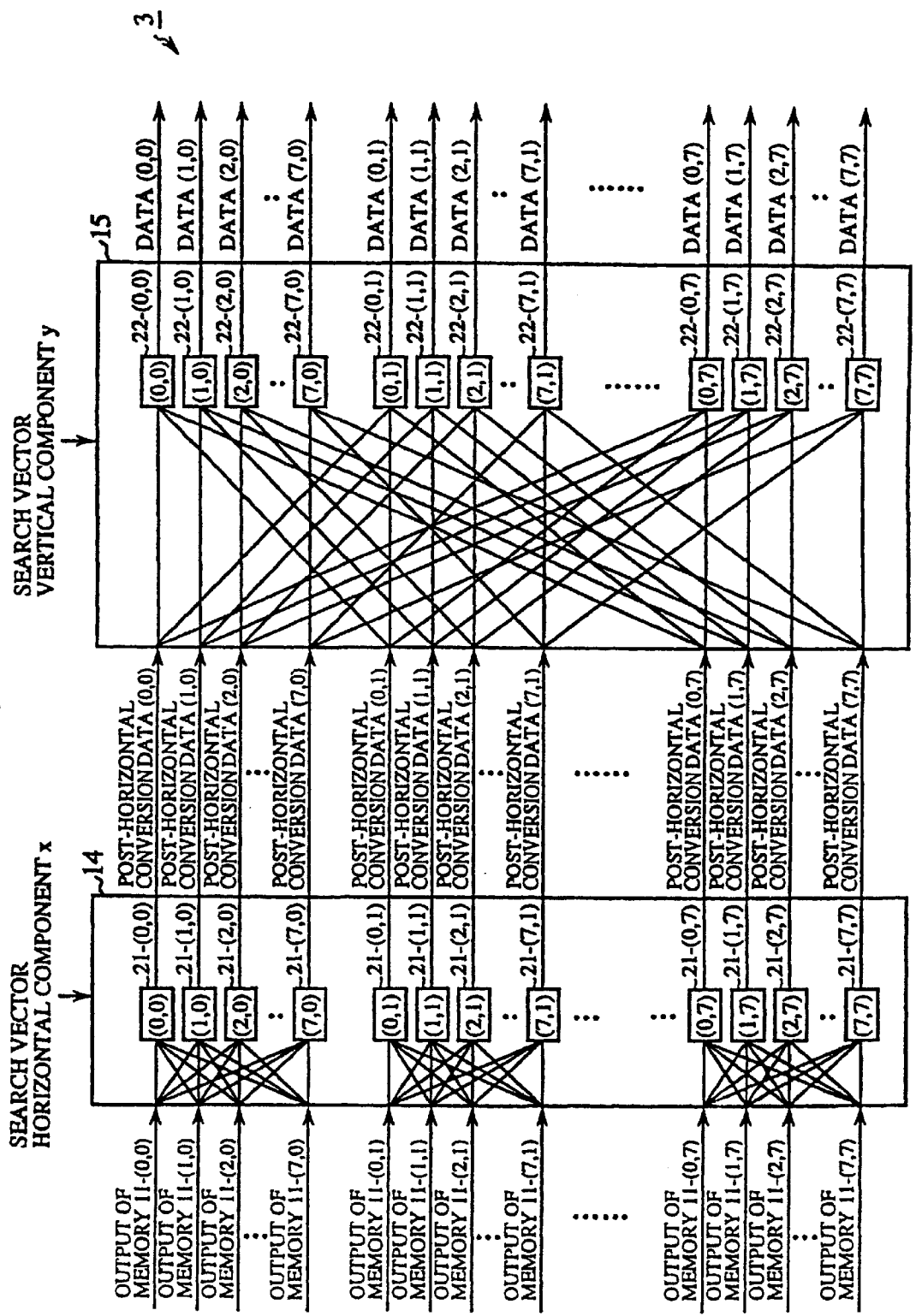
FIG. 3 is a block diagram depicting an example of a configuration of an exchange shown in FIG. 1.
Figure 4:
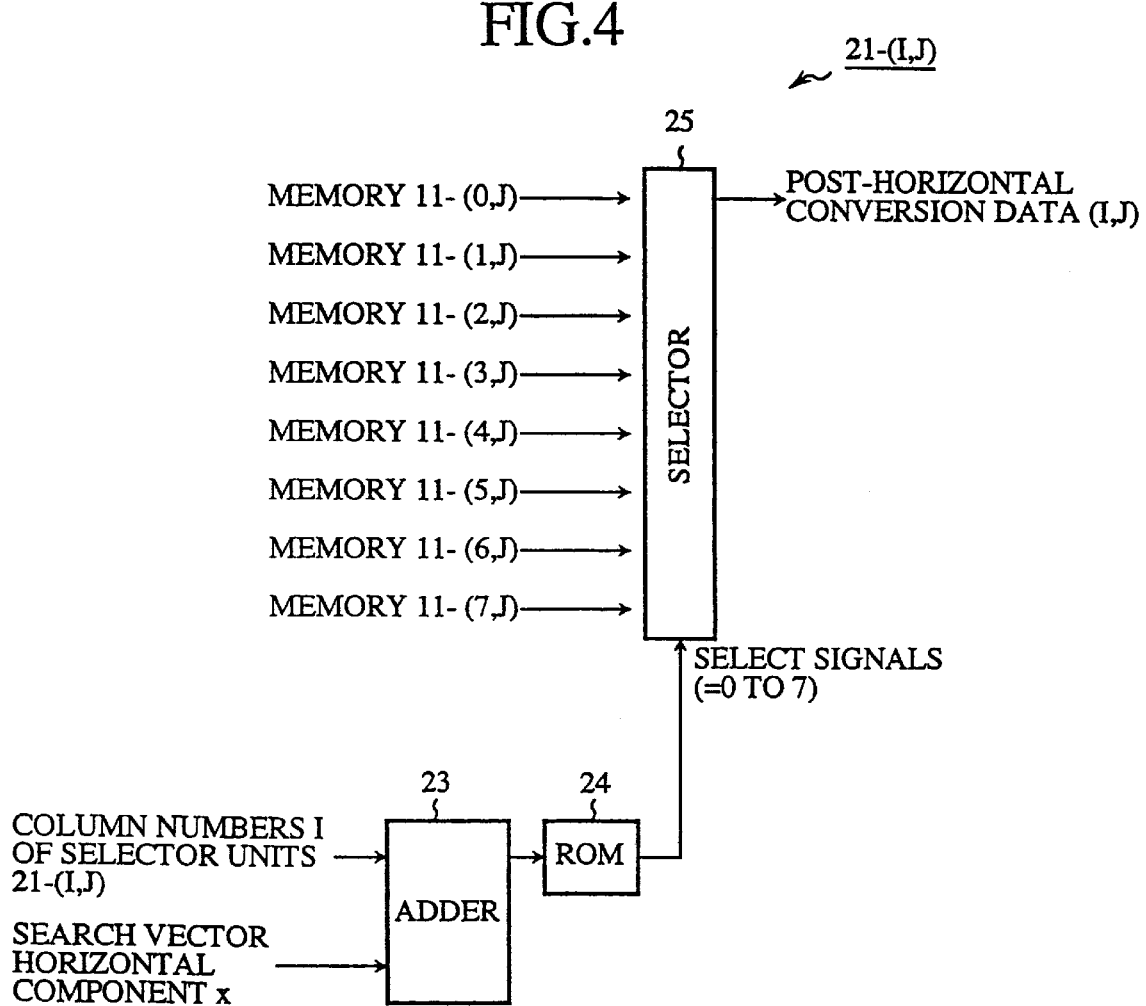
FIG. 4 is a block diagram showing an example of a configuration of each selector unit of a horizontal exchanger shown in FIG. 3.
Figure 5:
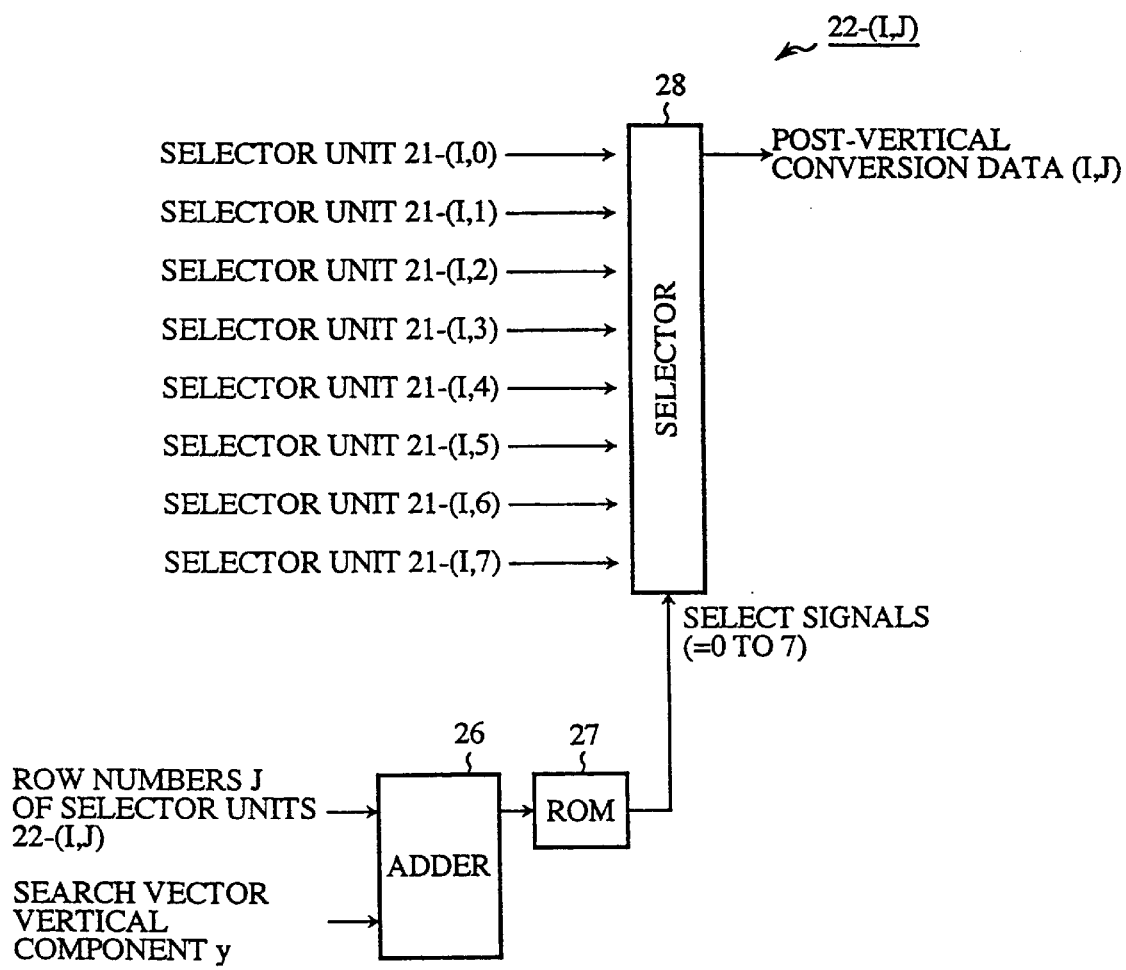
FIG. 5 is a block diagram illustrating an example of a configuration of each selector unit of a vertical exchanger shown in FIG. 3.

FIG. 1 is a block diagram showing a configuration of a motion vector detecting apparatus according to a first embodiment of the present invention. FIG. 2 is a block diagram illustrating one example of a circuit for controlling the input/output of each memory of a search window memory unit shown in FIG. 1. FIG. 3 is a block diagram depicting an example of a configuration of an exchange shown in FIG. 1, FIG. 4 is a block diagram showing an example of a configuration of each selector unit of a horizontal exchanger shown in FIG. 3, and FIG. 5 is a block diagram illustrating an example of a configuration of each selector unit of a vertical exchanger shown in FIG. 3, respectively.

Incidentally, the motion vector detecting apparatus according to the first embodiment is constructed such that each reference block is represented in the form of 8 rows and 8 columns.

In the drawing, reference numeral 1 indicates an already-coded frame memory for storing therein pixel data in a frame already coded in accordance with interframe prediction coding in an image processing system such as an H.261 system, an MPEG system or the like, i.e., pixel data for prediction in a frame coded at the present time. Upon prediction of the frame coded at the present time, motion vectors relative to respective blocks obtained from the division of the coded frame are detected. Namely, horizontal and vertical distances between the position of a reference block in the frame coded at the present time and a range corresponding to the block in the already-coded frame, i.e., the position of a search block are detected as the motion vectors.

Reference numeral 2 indicates a search window memory unit (coded data storing means, second storing means and selecting means) having memories 11-(I, J) for respectively storing pixel data of the same rows I and same columns J in areas each identical in size to the reference block, into which a search window is divided. Namely, when the memories 11-(I, J) are provided by the number identical to the number of pixels in the reference block and the search window is divided into N ranges each identical in size to the reference block, N pixel data of the same rows I and same columns J in the post-division areas are stored in the respective memories 11-(I, J).

Referring to FIG. 2, reference numeral 31 indicates an adder for calculating the sum of a horizontal component of a search vector and a horizontal position of the upper-left corner of the reference block as viewed from the upper-left corner of the search window and outputting the result of calculation thereof therefrom. Reference numeral 32 indicates a subtractor for subtracting each row number I of the memory 11-(I, J) from the output value of the adder 31 and outputting the result of subtraction thereof therefrom. Reference numeral 33 indicates an adder for calculating the sum of the output value of the subtractor 32 and a constant 7 and outputting the result of calculation thereof therefrom. Reference numeral 34 indicates a divider which outputs an integer portion of a value obtained by dividing the output value of the adder 33 by a constant 8.

Reference numeral 35 indicates an adder for calculating the sum of a search vector vertical component and a vertical position of the upper-left corner of the reference block as seen from the upper-left corner of the search window and outputting the result of calculation thereof therefrom. Reference numeral 36 indicates a subtractor for subtracting each column number J of the memory 11-(I, J) from the output value of the adder 35 and outputting the result of subtraction thereof therefrom. Reference numeral 37 indicates an adder for calculating the sum of the output value of the subtractor 36 and a constant 7 and outputting the result of calculation thereof therefrom. Reference numeral 38 indicates a divider for outputting an integer portion of a value obtained by dividing the output value of the adder 37 by a constant 8. Reference numeral 39 indicates a multiplier for multiplying the output value of the divider 38 by a constant 7 and outputting the result of multiplication therefrom.

Reference numeral 40 indicates an adder for calculating the sum of the output value of the divider 34 and the output value of the multiplier 39 and supplying the result of calculation to a selector 41 as a read address for each memory 11-(I, J). Reference numeral 41 indicates a selector which is supplied with a write address upon writing of pixel data into the corresponding memory 11-(I, J) and supplied with the read address upon reading of pixel data from the corresponding memory 11-(I, J), and which supplies either of those addresses to the memory 11-(I, J) in response to the value of a write/detection switching signal.

Referring back to FIG. 1, reference numeral 3 indicates a switchboard or exchange (selecting means) which is supplied with pixel data included in a search block at a position spaced away from the position of the reference block by the search vector, of pixel data stored in the memories 11-(0, 0) through 11-(7, 7) of the search window memory unit 2 and which outputs respective pixel data indicative of coordinate values in the search block being (I, J) to pixel comparators 13-(I, J) of an evaluation unit 4 respectively.

In the exchange 3 illustrated in FIG. 3, reference numeral 14 indicates a horizontal exchanger which is supplied with pixel data from memories 11-(0,J) through 11-(7,J) every rows J in the search block, selects respective one pixel data from all the pixel data through built-in selector units 21-(0,J) through 21-(7,J) according to the values of search vector horizontal components and outputs the selected data therefrom. Reference numeral 15 indicates a vertical exchanger which supplies pixel data from the selector units 21-(I, 0) through 21-(I, 7) to built-in selector units 22-(I, 0) through 22-(I, 7), selects respective one pixel data from all the pixel data through the selector units 22-(I, 0) through 22-(I, 7) according to the values of search vector vertical components and outputs the selected data therefrom.

In each selector unit 21-(I, J) shown in FIG. 4, reference numeral 23 indicates an adder for calculating the sum of each column number I of the selector unit 21-(I, J) and each search vector horizontal component and outputting the result of calculation to a ROM 24. Reference numeral 24 indicates the ROM for supplying the value of the remainder of 8 to the value outputted from the adder 23 to a selector 25 as each select signal. Reference numeral 25 indicates the selector for selecting values from memories 11-(S, J) according to values S of the select signals outputted from the ROM 24 and outputting the same therefrom.

In each selector unit 22-(I, J) shown in FIG. 5, reference numeral 26 indicates an adder for calculating the sum of each row number J of the selector unit 22-(I, J) and each search vector vertical component and outputting the result of calculation to a ROM 27. Reference numeral 27 indicates the ROM for supplying the value of the remainder of 8 to the value outputted from the adder 26 to a selector 28 as each select signal. Reference numeral 28 indicates the selector for selecting values from the selector units 21-(I, S) according to values S of the select signals outputted from the ROM 27 and outputting the same therefrom.

Referring back to FIG. 1, reference numeral 5 indicates a coded frame memory for storing therein pixel data in a frame coded at the present time. Reference numeral 6 indicates a reference register unit (block data storing means and first storing means) at for storing respective pixel data of Ith rows and Jth columns (where I=0, . . . , 7, and J=0, . . . , 7) in any of blocks of 8 rows×8 columns obtained from the division of the frame coded at the present time, i.e., a reference block corresponding to a block to be processed at the present time, in their corresponding registers 12-(I, J). Incidentally, 64 pixels lying from the mth row and nth column to the m+7th row and n+7th column in the frame constitute a block to be processed at the present time.

Reference numeral 4 indicates an evaluation unit (comparing means) having pixel comparators 13-(I, J) for respectively comparing pixel data in the respective registers 12-(I, J) (where I=0, . . . , 7, and J=0, . . . , 7) of the reference register unit 6 and the pixel data outputted from the selector units 22-(I, J) of the exchange 3.

Reference numeral 7 indicates a motion vector detection unit (detecting means and search vector setting means) for detecting the optimum search vector as a motion vector, based on the results of comparisons y by the respective pixel comparators 13-(I, J) of the evaluation unit 4 and setting a search vector for the exchange 3. For example, the differences between respective two pixel data are calculated by the respective pixel comparators 13-(I, J) and a search vector at the time that the sum of absolute values of those differences is minimum, is defined as a motion vector.

The operation will next be described.

Figure 6:
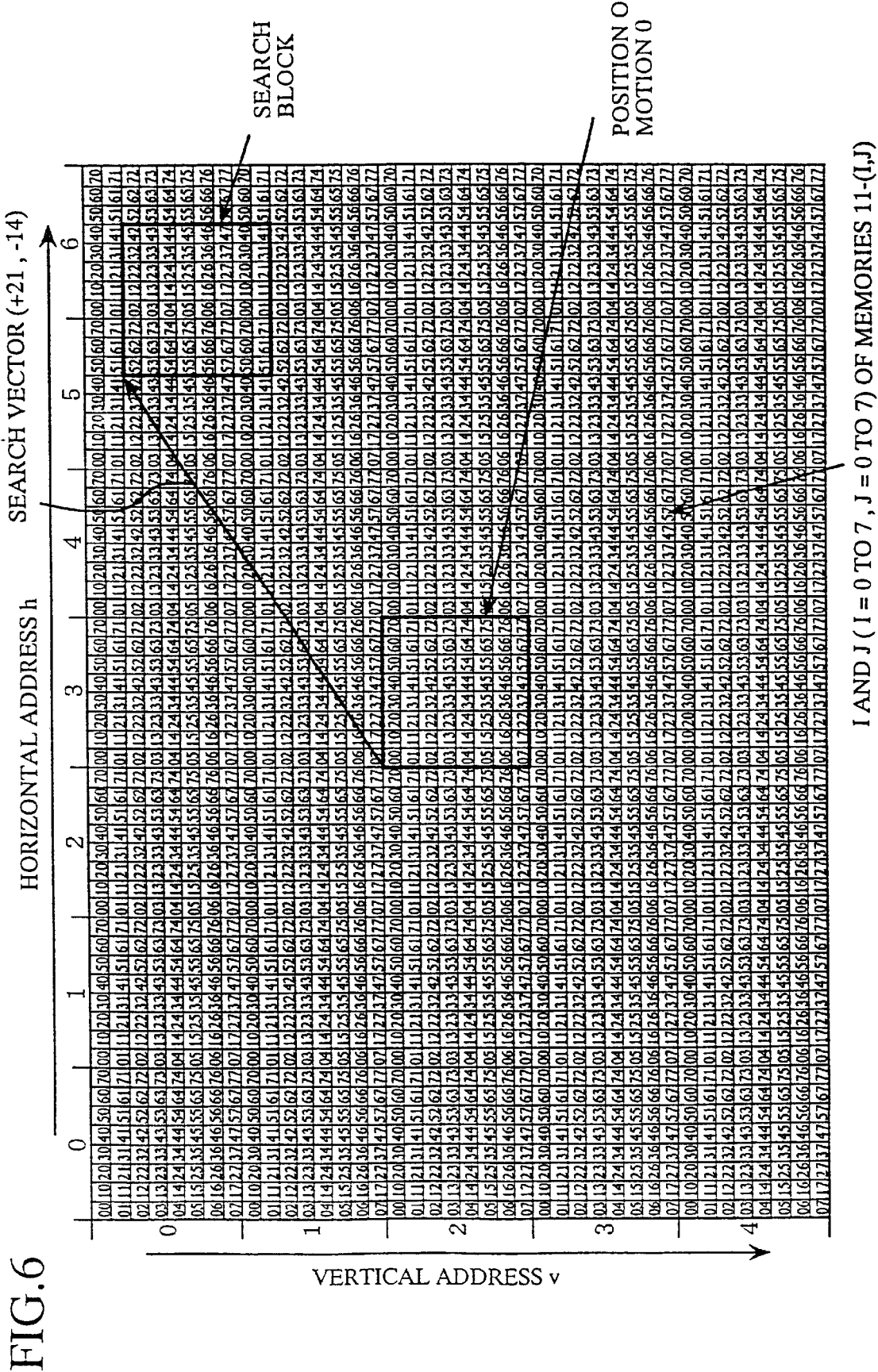
FIG. 6 is a diagram depicting one example of divisions of a search window.
Figures 7, 8:
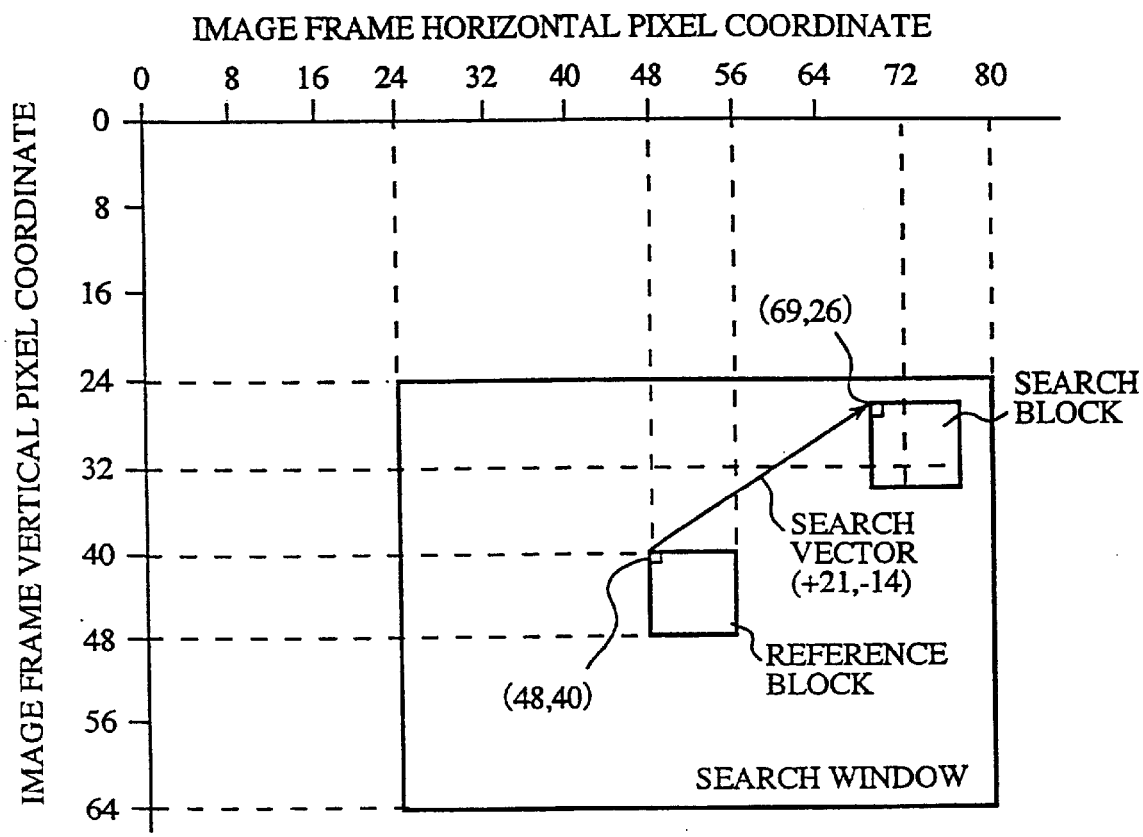
FIG. 7 is a diagram showing examples of a search window and a search block.
FIG. 8 is a diagram illustrating one example of the relationship between addresses in each memory of the search window memory unit and coordinate values indicative of pixels, which are stored thereat.

FIG. 6 is a diagram showing one example of divisions of a search window. FIG. 7 is a diagram showing examples of a search window and a search block. FIG. 8 is a diagram illustrating one example of the relationship between addresses in each memory of the search window memory unit and coordinate values indicative of pixels, which are stored thereat. FIG. 9 is a diagram showing examples of coordinate values about pixel data outputted from each memory of the search window memory unit, coordinate values about pixel data outputted from each selector of the horizontal exchanger of the exchange, coordinate values about pixel data outputted from each selector of the vertical exchanger of the exchange, and coordinate values about pixel data in a reference block;

First of all, the already coded frame memory 1 outputs pixel data of the same rows I and same columns J in areas each identical in size to a block, into which the search window is divided, to the memories 11-(I, J) of the search window memory unit 2.

When horizontal addresses h and vertical addresses v are assigned to the respective areas each identical in size to a reference block, into which the search window is divided, as shown in FIG. 6 by way of example at this time, the memories 11-(I, J) respectively store pixel data of Jth rows and Ith columns in a range given by the horizontal addresses h and the vertical addresses v at addresses of values (7×v+h). When the search window is divided into seven in the horizontal direction and divided into five in the vertical direction as shown in FIG. 6, the horizontal addresses h range from 0 to 6 in value and the vertical addresses v range from 0 to 4 in value.

When coordinate values corresponding to a pixel located at the upper-left corner of a reference block of 8 rows and 8 columns are given as (48, 40) and a search vector is given as (21, −14) as shown in FIG. 7 by way of example, pixel data corresponding to coordinate values (24, 24) is stored at an address 1 of the memory 11-(0, 0) and pixel data corresponding to coordinate values (32, 24) is stored at an address 2 of the memory 11-(0, 0). Respective pixel data are subsequently stored in the same manner as described above. Similarly, pixel data corresponding to coordinate values (25, 24) is stored at an address 1 of the memory 11-(1, 0) and pixel data corresponding to coordinate values (33, 24) is stored at an address 2 of the memory 11-(1, 0). Respective pixel data are subsequently stored in the same manner as described above.

Thus, the pixel data in the search window are respectively stored in the memories 11-(I, J) of the search window memory unit 2.

Next, when the searching of a motion vector is executed, the motion vector detection unit 7 supplies a predetermined search vector to the search window memory unit 2 and the exchange 3.

In the search window memory unit 2, a search vector horizontal component is supplied to the adder 31 and a search vector vertical component is supplied to the adder 35. A read address for each memory 11-(I, J), which corresponds to the supplied search vector, is calculated by the adders 31, 33, 35, 37 and 40, the subtractors 32 and 36, the dividers 34 and 38, and the multiplier 39. The memories 11-(I, J) respectively output pixel data stored at the supplied read addresses to the selector units 21-(0,J) through 21-(7,J) of the exchange 3.

Incidentally, when x is defined as the search vector horizontal component, y is defined as the search vector vertical component, SWH0 is defined as a horizontal position of the upper-left corner of the reference block as seen from the upper-left corner of the search window, and SWV0 is defined as a vertical position of the upper-left corner of the reference block as viewed from the upper-left corner of the search window, the read addresses A (I, J) corresponding to the memories 11-(I, J) are calculated by the adders 31, 33, 35, 37 and 40, the subtractors 32 and 36, the dividers 34 and 38, and the multiplier 39 in accordance with the following equation:

$$A (I, J)=(int((SWV0+y-J+7)/8))\times 7+int((SWH0+x-I+7)/8)$$

where int(a) is defined as the largest integer of integers less than or equal to a.

When the coordinate values corresponding to the pixel located at the upper-left corner of the reference block of 8 rows and 8 columns are given as (48, 40) and the search vector is given as (21, −14) as shown in FIG. 7 by way of example, coordinate values in a frame, corresponding to pixel data outputted from the memories 11-(0, 0) through 11-(7, 7) are represented as shown in FIG. 9A.

In the exchange 3, each of the selector units 21-(I, J) of the horizontal exchanger 14 selects any of the values from the memories 11-(0,J) through 11-(7,J) according to the search vector horizontal component supplied from the motion vector detection unit 7 and outputs the selected value to each of the selector units 22-(I, 0) through 22-(I, 7) of the vertical exchanger 15.

In each selector unit 21-(I, J) at this time, select signals are calculated based on the column number I of each selector unit 21-(I, J) and the search vector horizontal component by the adder 23 and the ROM 24 and then supplied to the selector 25. A value from each of the memories 11-(SS, J) is outputted according to the value SS of each select signal. Incidentally, the values SS of the select signals are calculated in accordance with the following equation by the adder 23 and the ROM 24 on the basis of the column numbers I of the selector units 21-(I, J) and the search vector horizontal component x.

$$SS=mod (I+x, 8)$$

where mod (a, b) is defined as the residue or remainder of b with respect to a.

When the coordinate values corresponding to the pixel located at the upper-left corner of the reference block of 8 rows and 8 columns are given as (48, 40) and the search vector is given as (21, −14) as shown in FIG. 7 by way of example, coordinate values in a frame, corresponding to pixel data outputted from the selector units 21-(0, 0) through 21-(7, 7) of the horizontal exchanger 14 of the exchange 3 are represented as shown in FIG. 9B.

Thereafter, each of the selector units 22-(I, J) of the vertical exchanger 15 selects any of values from the selector units 21-(I, 0) through 21-(I, 7) according to the search vector vertical component supplied from the motion vector detection unit 7 and outputs the selected value to each of the pixel comparators 13-(I, J).

In each selector unit 22-(I, J) at this time, select signals are calculated based on the row number J of each selector unit 22-(I, J) and the search vector vertical component by the adder 26 and the ROM 27 and then supplied to the selector 28. A value from each of the selector units 21-(I, SS) is outputted according to the value SS of each select signal. Incidentally, the values SS of the select signals are calculated by the adder 26 and the ROM 27 on the basis of the row numbers J of the selector units 22-(I, J) and the search vector vertical component y in accordance with the following equation.

$$SS=mod (J+y, 8)$$

When the coordinate values corresponding to the pixel located at the upper-left corner of the reference block of 8 rows and 8 columns are given as (48, 40) and the search vector is given as (21, −14) as shown in FIG. 7 by way of example, coordinate values in a frame, corresponding to pixel data outputted from the selector units 22-(0, 0) through 22-(7, 7) of the vertical exchanger 15 of the exchange 3 are represented as shown in FIG. 9C.

On the other hand, the coded frame memory 5 allows the registers 12-(0, 0) through 12-(7, 7) of the reference register unit 6 to store pixel data in any of blocks obtained from the division of a coded frame.

When the coordinate values corresponding to the pixel located at the upper-left corner of the reference block of 8 rows and 8 columns are given as (48, 40) as shown in FIG. 7 by way of example, coordinate values in the frame, corresponding to the pixel data of the reference block, which are stored in the registers 12-(0, 0) through 12-(7, 7), are represented as shown in FIG. 9D.

Further, the registers 12-(0, 0) through 12-(7, 7) of the reference register unit 6 supply pixel data to the pixel comparators 13-(0, 0) through 13-(7, 7) of the evaluation unit 4 for each clock, respectively.

The pixel comparators 13-(I, J) of the evaluation unit 4 calculate the differences between pixel data from the selector units 22-(I, J) of the exchange 3 and the pixel data from the registers 12-(I, J) of the reference register unit 6 respectively and supply their differences to the motion vector detection unit 7. The motion vector detection unit 7 stores the sum of absolute values of the differences between the pixel data supplied from the evaluation unit 4 therein as an evaluation value in association with the search vector at this time.

The motion vector detection unit 7 supplies a new search vector to the search window memory unit 2 and the exchange 3, based on a predetermined order or the relationship between the already calculated search vector and evaluation value.

Thus, the motion vector detection unit 7 updates the search vector until the predetermined order is completed or the evaluation value reaches a predetermined value or less and determines a search vector at the time that the evaluation value is minimum, as a motion vector.

According to the first embodiment as described above, the reference register unit 6 stores the pixel data constituting each reference block therein. The search window memory unit 2 stores therein the pixel data in the search window every pixel data of the same rows and same columns in the areas each identical in size to the reference block, into which the search window of the coded frame is divided. Any of the pixel data respectively stored in the memories 11-(I, J) of the search window memory unit 2 is selected and the pixel data in the search block spaced away by the search vector from the position of the reference block is selected. The pixel data stored in the reference register unit 6 and the selected pixel data are compared every pixels. The corresponding motion vector is detected based on the result of comparison. Therefore, an advantageous effect can be obtained in that the search block can be moved in the two horizontal and vertical directions, the range in the search block, which highly correlates with the pixel data in the reference block, can be detected with efficiency, and the motion vector can be detected in a short time.

Although the size of the reference block is represented in the form of 8 rows and 8 columns in the first embodiment, it is needless to say that a similar apparatus can be implemented even when the reference block is given in another size.

Second Embodiment

Figure 10:
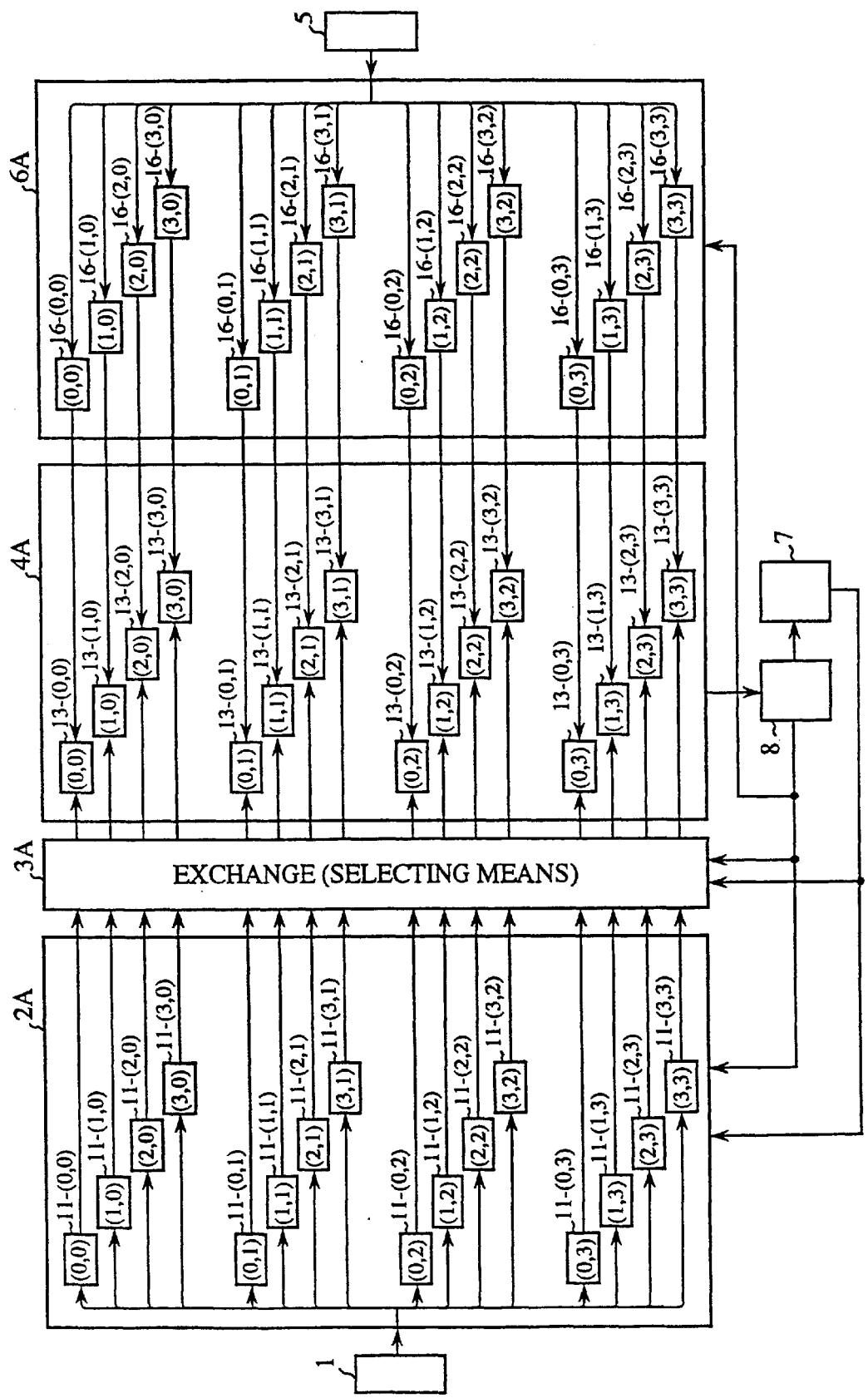
FIG. 10 is a block diagram illustrating a configuration of a motion vector detecting apparatus according to a second embodiment of the present invention.
Figure 11:
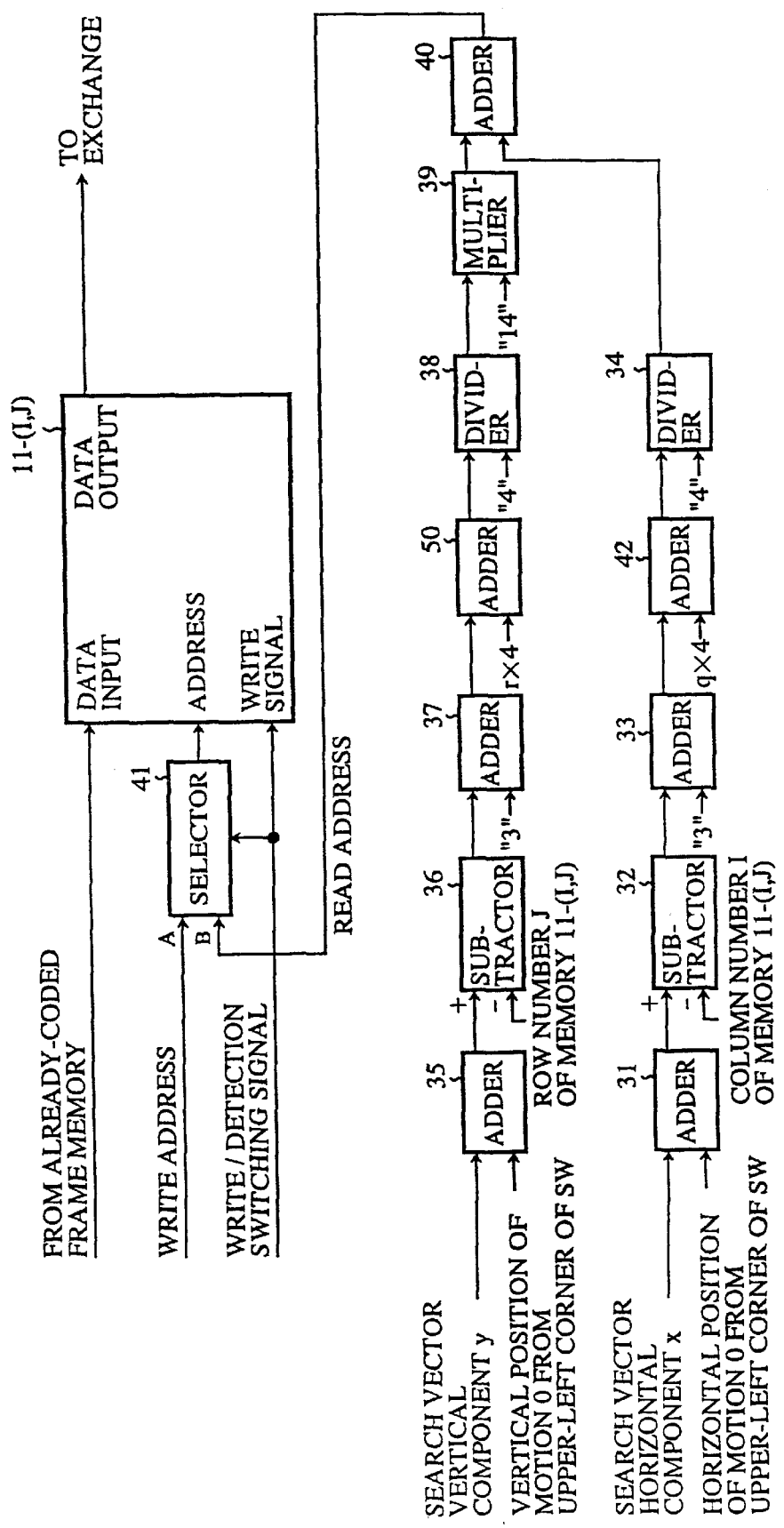
FIG. 11 is a block diagram depicting one example of a circuit for controlling the input/output of each memory of a search window memory unit shown in FIG. 10.
Figure 12:
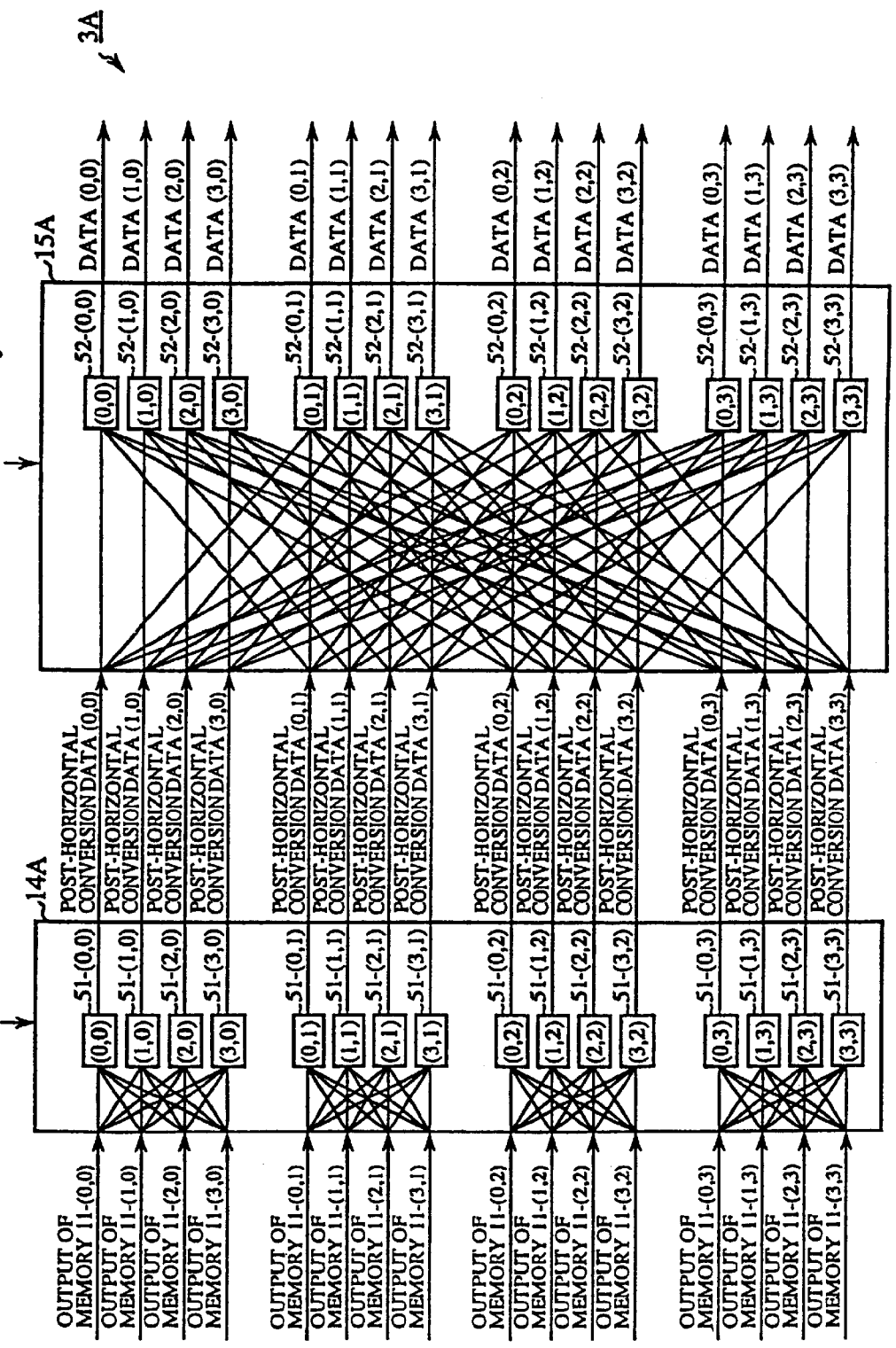
FIG. 12 is a block diagram showing an example of a configuration of an exchange shown in FIG. 10.
Figure 13:
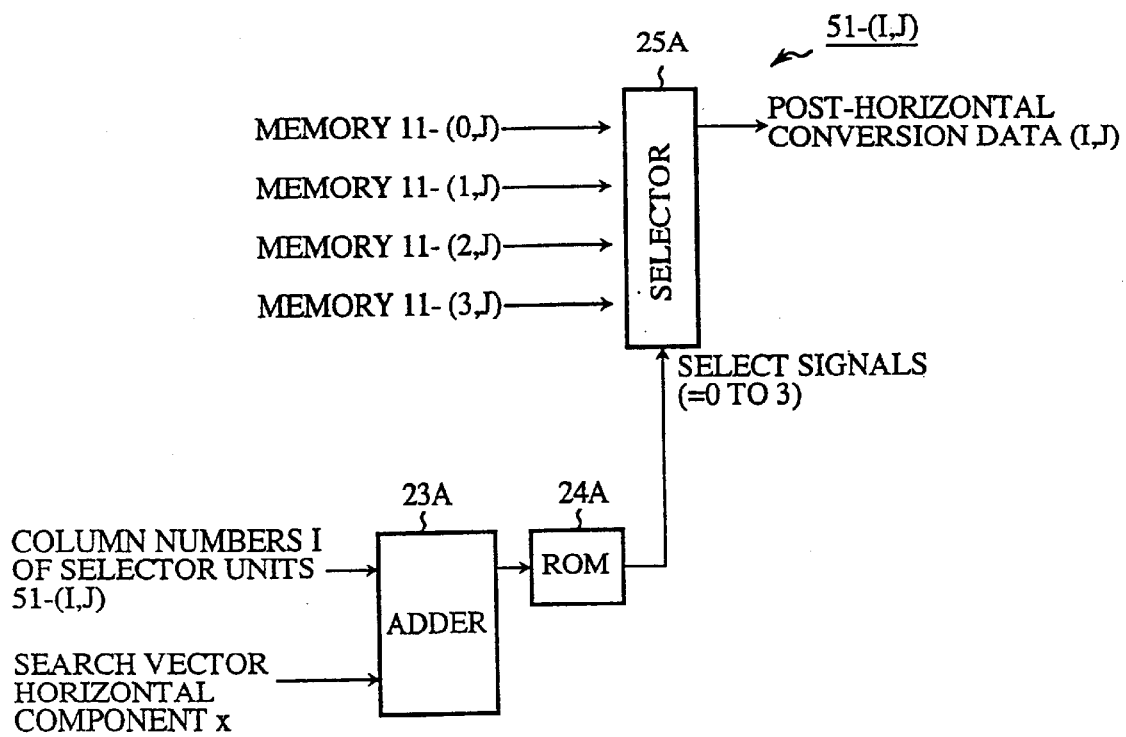
FIG. 13 is a block diagram illustrating an example of a configuration of a selector unit of a horizontal exchanger shown in FIG. 12.
Figure 14:
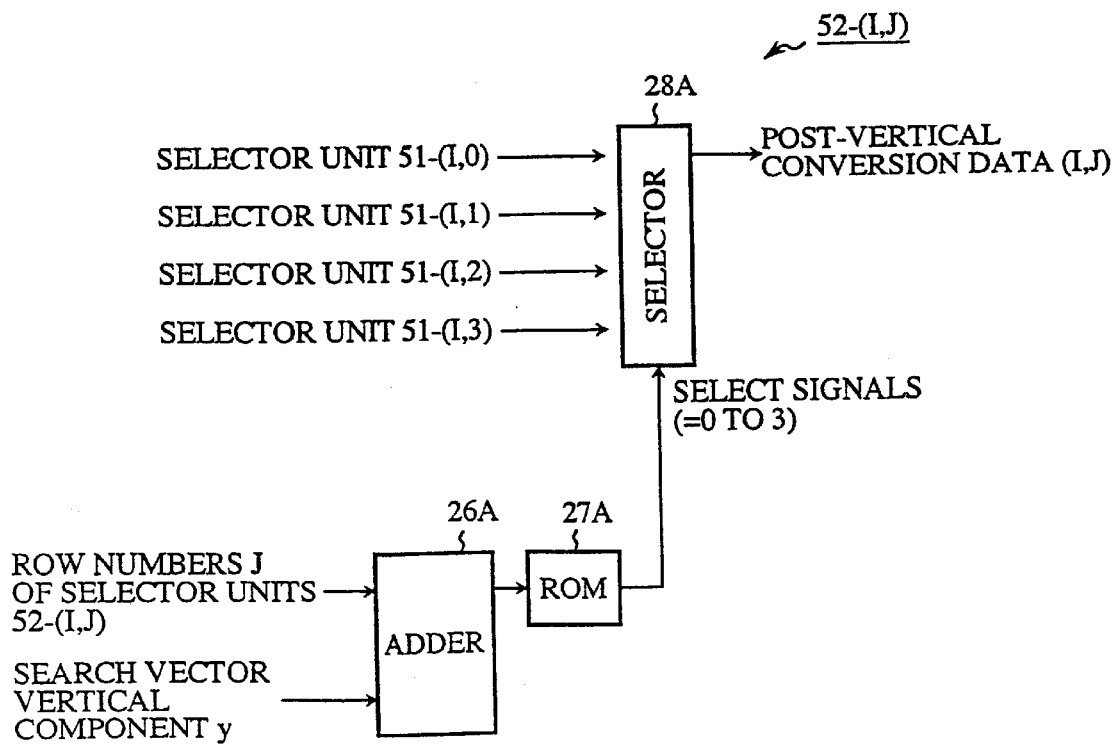
FIG. 14 is a block diagram illustrating an example of a configuration of a selector unit of a vertical exchanger shown in FIG. 12.
Figure 15:
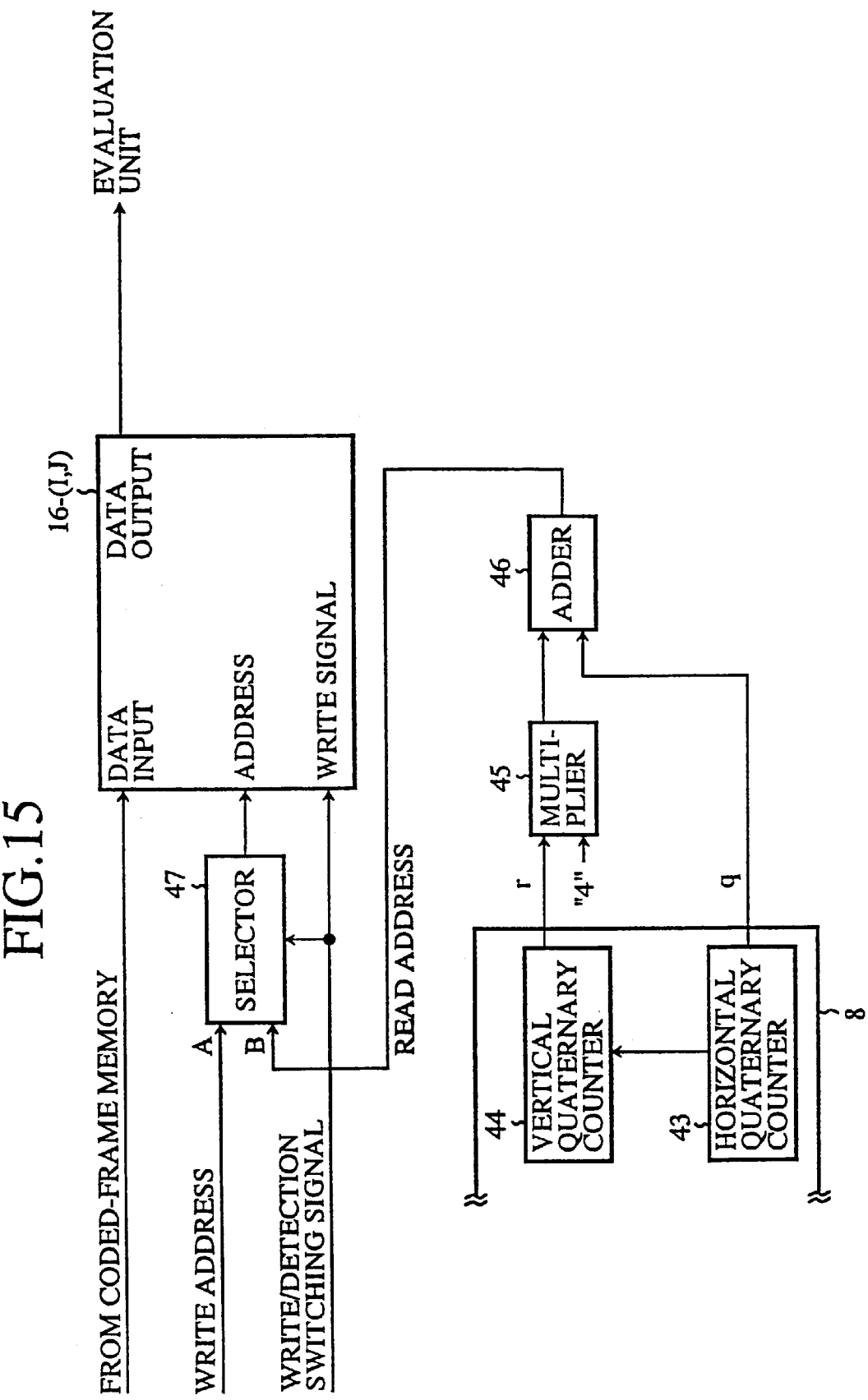
FIG. 15 is a block diagram showing one example of a circuit for controlling the input/output of each memory of a reference memory unit shown in FIG. 10.

FIG. 10 is a block diagram showing a configuration of a motion vector detecting apparatus according to a second embodiment of the present invention. FIG. 11 is a block diagram illustrating one example of a circuit for controlling the input/output of each memory of a search window memory unit shown in FIG. 10. FIG. 12 is a block diagram showing an example of a configuration of an exchange shown in FIG. 10, FIG. 13 is a block diagram illustrating an example of a configuration of each selector unit of a horizontal exchanger shown in FIG. 12, FIG. 14 is a block diagram showing an example of a configuration of each selector unit of a vertical exchanger shown in FIG. 12, and FIG. 15 is a block diagram depicting one example of a circuit for controlling the input/output of each memory of a reference memory unit shown in FIG. 10, respectively.

Incidentally, the motion vector detecting apparatus according to the second embodiment is constructed such that a reference block is represented in the form of 16 rows and 16 columns and each of blocks obtained from the division of the reference block is represented in the form of 4 rows and 4 columns.

Referring to FIG. 10, reference numeral 2A indicates a search window memory unit (coded data storing means, fourth storing means, sixth storing means and selecting means) having memories 11-(I, J) for respectively storing pixel data of the same rows I and same columns J in post-division areas obtained from the division of a search window, each identical in size to each of a predetermined number of blocks into which the reference block is divided. Namely, when the memories 11-(I, J) are provided by the number identical to the number of pixels in each divided block and the search window is divided into (N×M) pieces using blocks at the time that the reference block is divided into N, the (N×M) pixel data of the same rows I and same columns J in the respective areas are respectively stored in the respective memories 11-(I, J).

Referring to FIG. 11, reference numeral 33 indicates an adder for calculating the sum of a value outputted from a subtractor 32 and a constant 3 and outputting the result of calculation therefrom. Reference numeral 42 indicates an adder for calculating the sum of the output value of the adder 33 and a value equal to four times a horizontal address q (to be described later) corresponding to the divided blocks and outputting the result of calculation therefrom. Reference numeral 34 indicates a divider for outputting an integer portion of a value obtained by dividing the output value of the adder 42 by a constant 4. Reference numeral 37 indicates an adder for calculating the sum of a value outputted from a subtractor 36 and a constant 3 and outputting the result of calculation therefrom. Reference numeral 50 indicates an adder for calculating the sum of the output value of the adder 37 and a value equal to four times a vertical address r (to be described later) corresponding to the divided blocks and outputting the result of calculation therefrom. Reference numeral 38 indicates a divider for outputting an integer portion of a value obtained by dividing the output value of the adder 50 by a constant 4. Reference numeral 39 indicates a multiplier for calculating the product of the output value of the divider 38 and a constant 14 and outputting the result of calculation therefrom.

Since other parts shown in FIG. 11 are similar to those shown in FIG. 2, their description will be omitted.

Referring back to FIG. 10, reference numeral 3A indicates a switchboard or exchange (selecting means) which is supplied with pixel data, included in a search block identical in size to each divided block of the reference block and at a position spaced away from the position of each divided block of the reference block by a search vector, of pixel data stored in the memories 11-(0, 0) through 11-(3, 3) of the search window memory unit 2A and which outputs respective pixel data indicative of coordinate values (I, J) in each search divided-block being (I, J) to pixel comparators 13-(I, J) of an evaluation unit 4 respectively.

In the exchange 3A illustrated in FIG. 12, reference numeral 14A indicates a horizontal exchanger which is supplied with pixel data from memories 11-(0,J) through 11-(3, J) every rows J in the search divided-block, selects respective one pixel data from all the pixel data through built-in selector units 51-(0,J) through 51-(3, J) according to the values of search vector horizontal components and outputs the selected data therefrom. Reference numeral 15A indicates a vertical exchanger which supplies pixel data from the selector units 51-(I, 0) through 51-(I, 3) of the horizontal exchanger 14A to built-in selector units 52-(I, 0) through 52-(I, 3), selects respective one pixel data from all the pixel data through the selector units 52-(I, 0) through 52-(I, 3) according to the values of search vector vertical components and outputs the selected data therefrom.

In each selector unit 51-(I, J) shown in FIG. 13, reference numeral 23A indicates an adder for calculating the sum of a column number I of the selector unit 51-(I, J) and each search vector horizontal component and outputting the result of calculation to a ROM 24A. Reference numeral 24A indicates the ROM for supplying the value of the remainder of 4 to the value outputted from the adder 23A to a selector 25A as each select signal. Reference numeral 25A indicates the selector for selecting values from memories 11-(S, J) according to the values S of the select signals outputted from the ROM 24A and outputting the same therefrom.

In each selector unit 52-(I, J) shown in FIG. 14, reference numeral 2 6A indicates an adder for calculating the sum of a row number J of the selector unit 52-(I, J) and each search vector vertical component and outputting the result of calculation to a ROM 27A. Reference numeral 27A indicates the ROM for supplying the value of the remainder of 4 to the value outputted from the adder 26A to a selector 28A as each select signal. Reference numeral 28A indicates the selector for selecting values from the selector units 51-(I, S) according to the values S of the select signals outputted from the ROM 27A and outputting the same therefrom.

Referring back to FIG. 10, reference numeral 6A indicates a reference memory unit (block data storing means, third storing means, fifth storing means and seventh storing means) having memories 16-(I, J) for storing pixel data of the same rows I and same columns J in a predetermined number of blocks into which any (reference block) of blocks of 16 rows and 16 columns obtained from the division of a frame coded at the present time is divided. Namely, when the memories 16-(I, J) are provided by the number identical to the number of pixels in each divided block and the reference block is divided into M divided blocks, the M pixel data of the same rows I and same columns J in the respective divided blocks are respectively stored in the respective memories 16-(I, J).

In FIG. 15, reference numeral 45 indicates a multiplier for calculating the product of a vertical address r of each divided block, which is supplied from a vertical quaternary counter 44 of a block accumulator 8 and a constant 4 and outputting the result of calculation therefrom. Reference numeral 46 indicates an adder for calculating the sum of the output value of the multiplier 45 and a horizontal address q of each divided block, which is supplied from a horizontal quaternary counter 43 of the block accumulator 8 and outputting the result of calculation to a selector 47 as a read address for each memory 16-(I, J). Reference numeral 47 indicates the selector which is supplied with a write address upon writing pixel data into each memory 16-(I, J) and supplied with a read address upon reading pixel data from each memory 16-(I, J), and which supplies either one of the addresses to each memory 16-(I, J) according to the value of a write/detection switching signal.

Referring back to FIG. 10, reference numeral 4A indicates an evaluation unit (comparing means) having pixel comparators 13-(I, J) for respectively comparing pixel data of the respective memories 16-(I, J) (where I=0, . . . , 3, and J=0, . . . , 3) of the reference memory unit 6A and pixel data from the selector units 52-(I, J).

Reference numeral 8 indicates the block accumulator for counting divided blocks in the reference block in the horizontal and vertical directions by the horizontal quaternary counter 43 and the vertical quaternary counter 44, supplying these counts to the search window memory unit 2A, the exchange 3A and the reference memory unit 6A as the vertical address r and horizontal address q of each divided block, temporarily storing the results of comparisons by the respective pixel comparators 13-(I, J) of the evaluation unit 4A every divided blocks, and collectively outputting the comparison results for all the divided blocks constituting the block to a motion vector detection unit 7.

Reference numeral 7 indicates the motion vector detection unit for detecting the optimum search vector as a motion vector, based on the result of comparison corresponding to one block supplied from the block accumulator 8 and setting a search vector for the search window memory unit 2A and the exchange 3A. For example, the differences between two pixel data are calculated by the respective pixel comparators 13-(I, J) and a search vector at the time that the sum of absolute values of their differences in the reference block is minimum, is defined as a motion vector.

The operation will next be explained.

Figure 16:
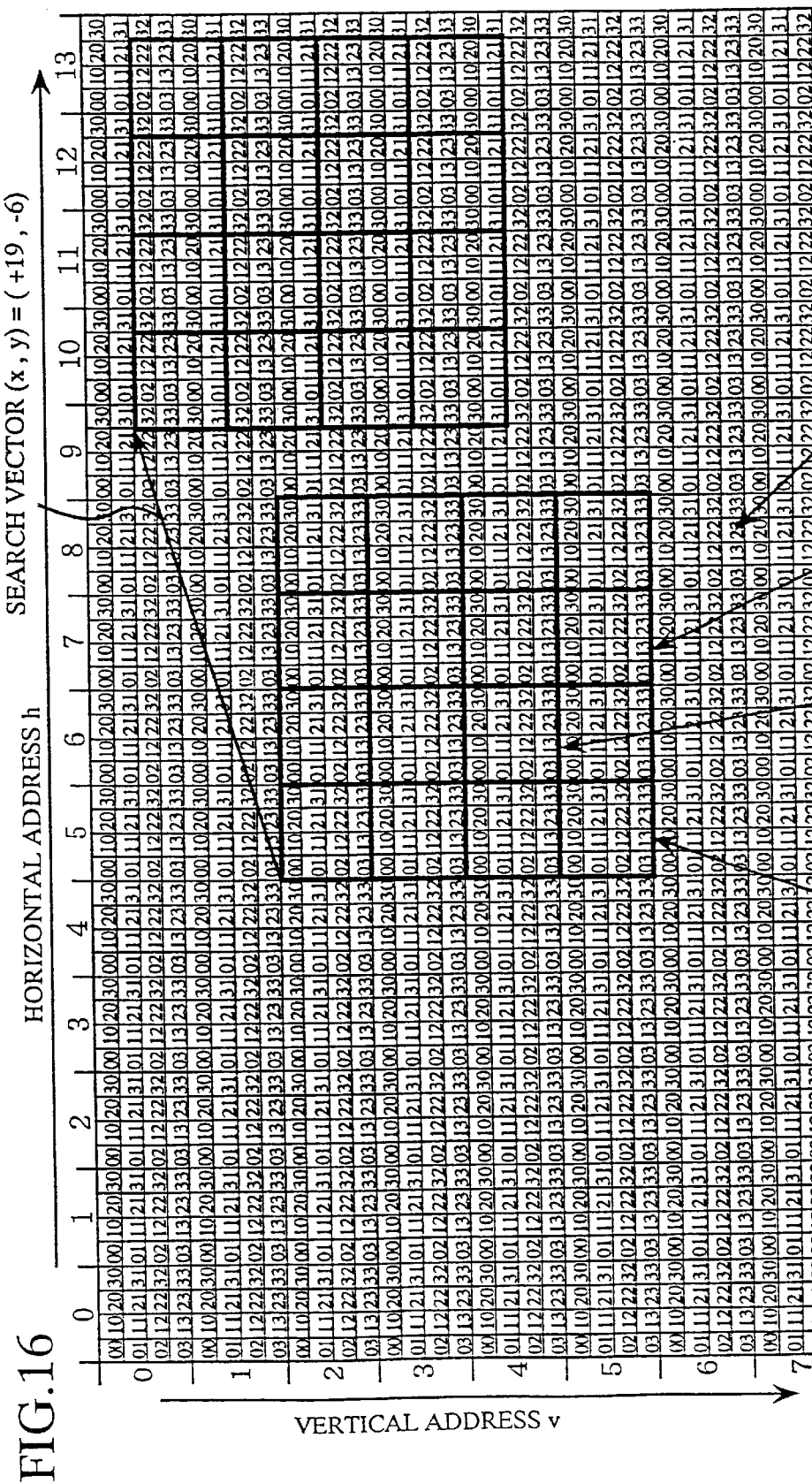
FIG. 16 is a diagram depicting examples of a search window and search divided-blocks.

FIG. 16 is a diagram showing one example of a search window and search divided-blocks. FIG. 17 is a diagram illustrating search divided-blocks employed in the second embodiment and horizontal and vertical addresses of the search divided-blocks.

First of all, the already coded frame memory 1 outputs pixel data of the same rows I and same columns J in areas each identical in size to each divided block in the reference block, into which the search window is divided, to the memories 11-(I, J) of the search window memory unit 2.

When in-block horizontal and vertical addresses q and r are assigned to respective divided blocks obtained by dividing the block into 16, and horizontal and vertical addresses h and v in the search window are assigned thereto as shown in FIGS. 16 and 17 by way of example, the memories 11-(I, J) respectively store pixel data of Jth rows and Ith columns in the divided blocks given by the horizontal and vertical addresses h and v at addresses of values (14×v+h).

Next, when the searching of a motion vector is executed, the motion vector detection unit 7 supplies a search vector to the search window memory unit 2A and the exchange 3A. Further, the block accumulator 8 successively supplies the horizontal and vertical addresses q and r of each search divided-block to the search window memory unit 2A, the exchange 3A and the reference memory unit 6A.

In the search window memory unit 2A, a search vector horizontal component is supplied to an adder 31 and a search vector vertical component is supplied to an adder 35. A value set to four times the horizontal address q of the search divided-block is supplied to the adder 42, and a value set to four times the vertical address r of the divided block is supplied to the adder 50.

Read addresses for the memories 11-(I, J), which correspond to the horizontal and vertical addresses q and r of the supplied search vector and divided blocks, are calculated by the adders 31, 33, 35, 37, 40, 42 and 50, the subtractors 32 and 36, the dividers 34 and 38, and the multiplier 39. The memories 11-(I, J) respectively output pixel data stored at the supplied read addresses to the selector units 51-(0,J) through 51-(3, J) of the exchange 3A.

Incidentally, when x is defined as the search vector horizontal component, y is defined as the search vector vertical component, SWH0 is defined as a horizontal position of the upper-left corner of the reference block as seen from the upper-left corner of the search window, and SWV0 is defined as a vertical position of the upper-left corner of the reference block as seen from the upper-left corner of the search window, the read addresses A (I, J) corresponding to the memories 11-(I, J) are calculated by the adders 31, 33, 35, 37 40, 42 and 50, the subtractors 32 and 36, the dividers 34 and 38, and the multiplier 39 in accordance with the following equation:

$$A (I, J)=(\text{mint } ((SWV0+y-J+r\times4+3)/4))\times14+\text{int}((SWH0+x-I+q\times4+3)/4)$$

In the exchange 3A, each of the selector units 51-(I, J) of the horizontal exchanger 14A selects any of the values from the memories 11-(0,J) through 11-(3, J) according to the search vector horizontal component supplied from the motion vector detection unit 7 and outputs the selected value to each of the selector units 52-(I, 0) through 52-(I, 3) of the vertical exchanger 15A.

In each selector unit 51-(I, J) at this time, select signals are calculated based on the column number I of each selector unit 51-(I, J) and the search vector horizontal component by the adder 23A and the ROM 24A and then supplied to the selector 25A. A value from each of the memories 11-(SS, J) is outputted according to the value SS of each select signal. Incidentally, the values SS of the select signals are calculated by the adder 23A and the ROM 24A on the basis of the column numbers I of the selector units 51-(I, J) and the search vector horizontal component x in accordance with the following equation:

$$SS=\text{mod } (I+x, 4)$$

Thereafter, each of the selector units 52-(I, J) of the vertical exchanger 15A selects any of values from the selector units 51-(I, 0) through 51-(I, 3) according to the search vector vertical component supplied from the motion vector detection unit 7 and outputs the selected value to each of the pixel comparators 13-(I, J) of the evaluation unit 4A.

In each selector unit 52-(I, J) at this time, select signals are calculated based on the row number I of each selector unit 52-(I, J) and the search vector vertical component by the adder 26A and the ROM 27A and then supplied to the selector 28A. A value from each of the selector units 51-(I, SS) is outputted according to the value SS of each select signal. Incidentally, the values SS of the select signals are calculated by the adder 26A and the ROM 27A on the basis of the row numbers I of the selector units 52-(I, J) and the search vector vertical component y in accordance with the following equation:

$$SS = \mod (J+y, 4)$$

On the other hand, a coded frame memory 5 allows the memories 16-(I, J) to store pixel data in any of blocks obtained from the division of a coded frame every pixel data of the same rows I and same columns J in the divided blocks.

Further, the memories 16-(0, 0) through 16-(3, 3) of the reference memory unit 6A supply pixel data in the divided blocks corresponding to the supplied horizontal and vertical addresses q and r to the pixel comparators 13-(0, 0) through 13-(3, 3) of the evaluation unit 4A for each clock, respectively.

In the reference memory unit 6A at this time, read addresses (=r×4+q) are calculated from the supplied horizontal and vertical addresses q and r by the multiplier 45 and the adder 46 and supplied to the memories 16-(0, 0) through 16-(3, 3) through the selector 47.

When the pixel data are respectively supplied from the exchange 3A and the reference memory unit 6A, the pixel comparators 13-(I, J) of the evaluation unit 4A calculate the differences between pixel data from the selector units 52-(I, J) of the exchange 3A and the pixel data from the memories 16-(I, J) of the reference memory unit 6A and supply the differences to the block accumulator 8. When the differences between the pixel data are supplied to the block accumulator 8, it outputs horizontal and vertical addresses q and r for specifying the next divided block. On the other hand, when the differences between the pixel data corresponding to one block are accumulated in the block accumulator 8, it outputs their differences to the motion vector detection unit 7. The motion vector detection unit 7 stores the sum of absolute values of the differences between the pixel data supplied from the evaluation unit 4A therein as an evaluation value in association with the search vector at this time.

The motion vector detection unit 7 supplies a new search vector to the search window memory unit 2A and the exchange 3A, based on a predetermined order or the relationship between the already calculated search vector and evaluation value.

Thus, the motion vector detection unit 7 updates the corresponding search vector until the predetermined order is completed or the evaluation value reaches a predetermined value or less, and determines a search vector at the time that the evaluation value is minimum, as a motion vector.

According to the second embodiment as described above, the reference memory unit 6A stores therein the pixel data constituting each of the blocks into which the reference block is divided. The search window memory unit 2A stores therein the pixel data in the search window of the coded frame every pixel data of the same rows and same columns in the areas each identical in size to each divided block, into which the search window of the coded frame is divided. Any of the pixel data of the same rows and same columns in the post-division areas, which are respectively stored in the memories 11-(I, J) of the search window memory unit 2A, are respectively selected and the search divided-block at the position spaced away by the search vector from the position of each divided block is selected. The pixel data stored in the reference memory unit 6A and the selected pixel data are compared every pixels and the motion vector is detected based on the results of comparison. Therefore, an advantageous effect can be obtained in that the number of the pixel comparators 13-(I, J) of the evaluation unit 4A is decreased to reduce a circuit scale and the apparatus can be reduced in cost.

Although the size of the reference block is represented in the form of 16 rows and 16 columns and the size of each divided block is given in the form of 4 rows and 4 columns in the second embodiment, it is needless to say that a similar apparatus can be implemented even when the reference block and each divided block are given in another size.

Third Embodiment

A motion vector detecting apparatus according to a third embodiment of the present invention is one wherein the circuit for controlling the input/output of each memory of the search window memory unit 2A and the input/output of each memory of the reference memory unit 6A both employed in the motion vector detecting apparatus according to the second embodiment are changed and pixel data are compared after they have been thinned out at a predetermined rate and in a predetermined pattern.

Figure 18:
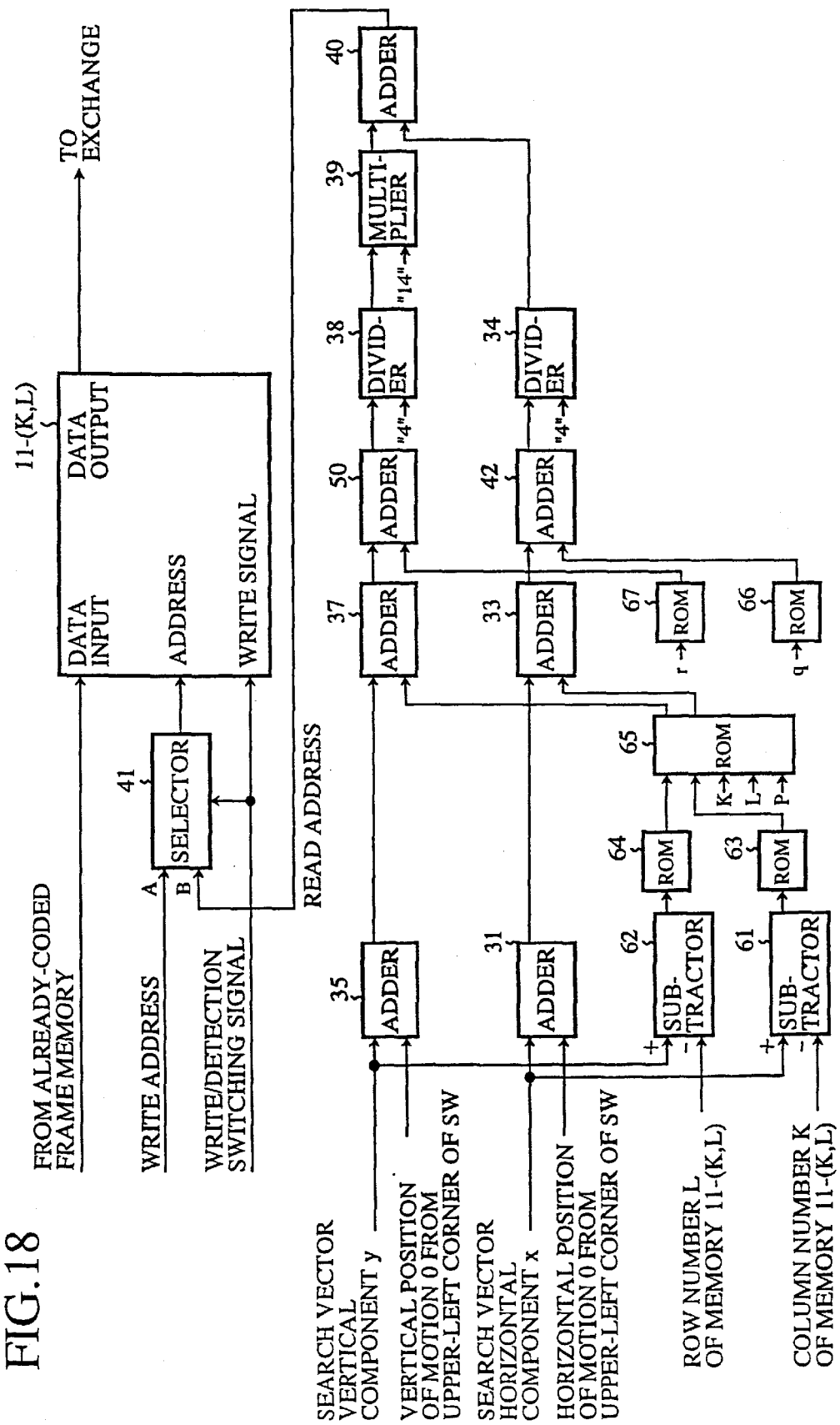
FIG. 18 is a block diagram illustrating one example of a circuit for controlling the input/output of each memory of a search window memory unit employed in a motion vector detecting apparatus according to a third embodiment of the present invention.
Figure 19:
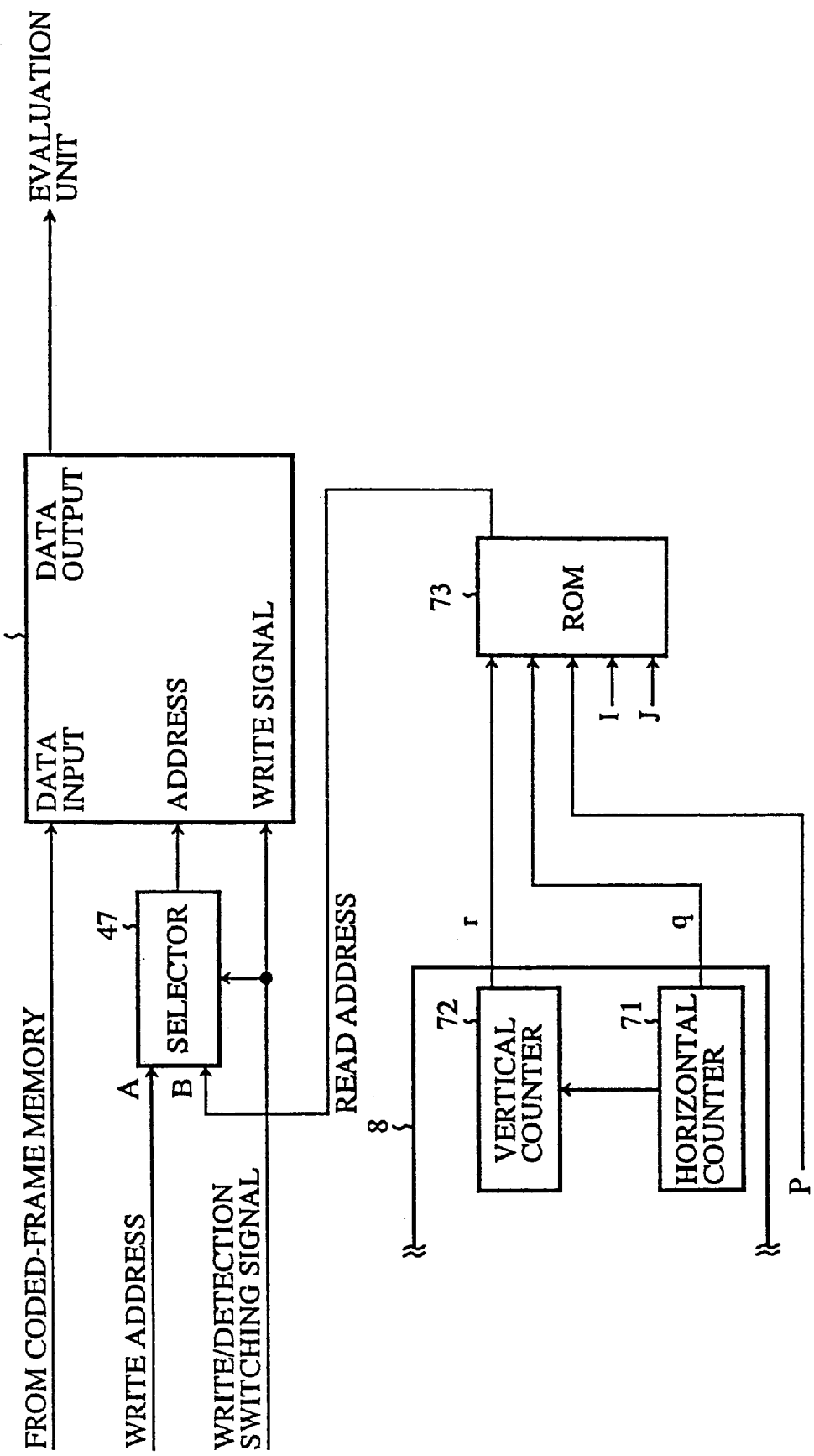
FIG. 19 is a block diagram depicting one example of another circuit for controlling the input/output of each memory of a reference memory unit employed in the motion vector detecting apparatus according to the third embodiment of the present invention.

FIG. 18 is a block diagram illustrating one example of a circuit for controlling the input/output of each memory of a search window memory unit employed in a motion vector detecting apparatus according to a third embodiment of the present invention. FIG. 19 is a block diagram depicting one example of another circuit for controlling the input/output of each memory of a reference memory unit employed in the motion vector detecting apparatus according to the third embodiment of the present invention.

In FIG. 18, reference numeral 31 indicates an adder for calculating the sum of a search vector horizontal component and a horizontal position of the upper-left corner of a reference block as viewed from the upper-left corner of a search window and outputting the result of calculation therefrom. Reference numeral 35 indicates an adder for calculating the sum of a search vector vertical component and a vertical position of the upper-left corner of the reference block as seen from the upper-left corner of the search window and outputting the result of calculation therefrom.

Reference numeral 61 indicates a subtractor for calculating a value obtained by subtracting a column number K of each memory 11-(K, L) from a search vector horizontal component x and outputting the result of calculation therefrom. Reference numeral 62 indicates a subtractor for calculating a value obtained by subtracting a row number L of each memory 11-(K, L) from a search vector vertical component y and outputting the result of calculation therefrom.

Reference numeral 63 indicates a ROM which is supplied with the output value of the subtractor 61 and outputs the remainder of 4 to the output value. Reference numeral 64 indicates a ROM which is supplied with the output value of the subtractor 63 and outputs the remainder of 4 to the output value.

Reference numeral 65 indicates a ROM which is supplied with the output value of the ROM 63, the output value of the ROM 64, the column and row numbers K and L of each memory 11-(K, L) and a parameter P for setting the type of thinning pattern of pixel data and which outputs the value (=fh×mod (y−L, 4)) of the product of a value fh corresponding to the column number K and row number L and the output value of the ROM 64 to an adder 37 and outputs the value (=fv×mod (x−K, 4)) of the product of a value fv corresponding to the column number K and row number L and the output value of the ROM 63 to an adder 33.

Figure 20:
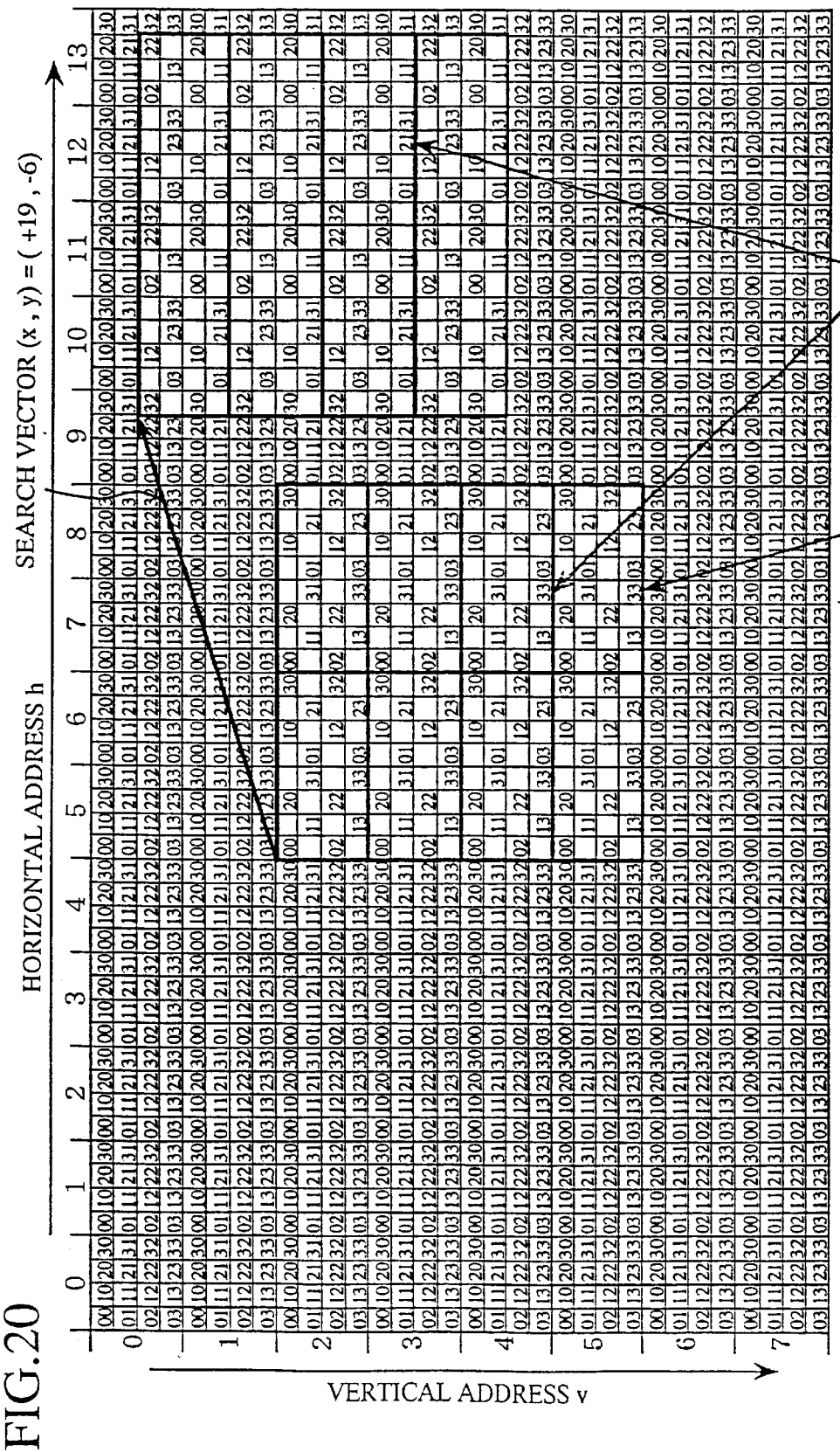
FIG. 20 is a diagram showing one example of a search block at the time that pixel data is thinned out to ½ in a first pattern.

Incidentally, the parameter P for setting the type of the thinning pattern of the pixel data is set to 0 when the thinning rate is ½ and the thinning pattern is a first pattern (see FIG. 20). When the thinning rate is ¼ and the thinning pattern is a second pattern (see FIG. 21), the parameter P is set to 1. When the thinning rate is ⅛ and the thinning pattern is a third pattern (see FIG. 22), the parameter P is set to 2. When the thinning rate is 1/16 and the thinning pattern is a fourth pattern (see FIG. 23), the parameter P is set to 3. The ROM 65 changes the relationship between the column and row numbers K and L and the value fh and the relationship between the column and row numbers K and L and the value fv according to the value of the parameter P.

When the pixel data is thinned to ½ in the first pattern, for example, the following relationship between the column and row numbers K and L and the values fh and fv is used.

| K, | L | fh, | fv |
|---|---|---|---|
| 0 | 0 | 0, | 0 |
| 1, | 0 | 5, | 0 |
| 2, | 0 | 10, | 0 |
| 3, | 0 | 15, | 0 |
| 0, | 1 | 0, | 5 |
| 1, | 1 | 5, | 5 |
| 2, | 1 | 10, | 5 |
| 3, | 1 | 15, | 5 |
| 0, | 2 | 12, | 2 |
| 1, | 2 | 9, | 2 |
| 2, | 2 | 6, | 2 |
| 3, | 2 | 3, | 2 |
| 0, | 3 | 12, | 7 |
| 1, | 3 | 9, | 7 |
| 2, | 3 | 6, | 7 |
| 3, | 3 | 3, | 7 |

Reference numeral 33 indicates an adder for calculating the sum of the output value of the adder 31 and one output value (=fv×mod (x−K, 4)) of the ROM 65 and outputting the result of calculation therefrom. Reference numeral 37 indicates an adder for calculating the sum of the output value of the adder 35 and the other output value (=fh×mod (y−L, 4)) of the ROM 65 and outputting the result of calculation therefrom.

Reference numeral 66 indicates a ROM which is supplied with a horizontal address q of each divided block and outputs the value of the product of the horizontal address q and the number of pixels in the horizontal direction of each divided block. Reference numeral 67 indicates a ROM which is supplied with a vertical address r of each divided block and outputs the value of the product of the vertical address r and the number of pixels in the vertical direction of each divided block.

Reference numeral 42 indicates an adder for calculating the sum of the output value of the adder 33 and the output value of the ROM 66 and outputting the result of calculation therefrom. Reference numeral 50 indicates an adder for calculating the sum of the output value of the adder 37 and the output value of the ROM 67 and outputting the result of calculation therefrom.

Reference numeral 34 indicates a divider which is supplied with the output value of the adder 42 and output an integer portion of a value obtained by dividing the output value of the adder 50 by a constant 4. Reference numeral 39 indicates a multiplier for multiplying the output value of the divider 38 by a constant 14 and outputting the result of multiplication therefrom.

Reference numeral 40 indicates an adder for calculating the sum of the output value of the divider 34 and the output value of the multiplier 39 and supplying the result of calculation to a selector 41 as a read address for each memory 11-(K, L). Reference numeral 41 indicates the selector which is supplied with a write address upon writing pixel data into each memory 11-(K, L) and supplied with the read address upon reading pixel data from each memory 11-(K, L) and which supplies either one of those addresses to the corresponding memory 11-(K, L) according to the value of a write/detection switching signal.

In FIG. 19, reference numeral 73 indicates a ROM which outputs a value stored in association with a parameter P for setting the type of thinning pattern of pixel data, a horizontal address q and a vertical address r of each divided block, which are supplied from a horizontal counter 71 and a vertical counter 72 of a block accumulator 8, and column and row numbers I and J of each memory 16-(I, J), to a selector 47 as a read address for each memory 16-(I, J).

Incidentally, the relationship between these values and the output value A of the ROM 73 is given by the following equation:

$$A = NHB \times \text{int} ((r \times NV + fv)/4) + \text{int}((q \times NH + fh)/4)$$

where NV indicates the number of pixels in the vertical direction of each divided block, NH indicates the number of pixels in the horizontal direction of each divided block, and NHB indicates the number of the divided blocks in the horizontal direction. Further, fh and fv indicate values stored in relation to the column and row numbers I and J of each memory 16-(I, J).

When the pixel data is thinned to ½ in the first pattern, for example, the following relationship between the column and row numbers I and J and the values fh and fv is used.

| I, | J | fh, | fv |
|---|---|---|---|
| 0 | 0 | 0, | 0 |
| 1, | 0 | 5, | 0 |
| 2, | 0 | 10, | 0 |
| 3, | 0 | 15, | 0 |
| 0, | 1 | 0, | 5 |
| 1, | 1 | 5, | 5 |
| 2, | 1 | 10, | 5 |
| 3, | 1 | 15, | 5 |
| 0, | 2 | 12, | 2 |
| 1, | 2 | 9, | 2 |
| 2, | 2 | 6, | 2 |
| 3, | 2 | 3, | 2 |
| 0, | 3 | 12, | 7 |
| 1, | 3 | 9, | 7 |
| 2, | 3 | 6, | 7 |
| 3, | 3 | 3, | 7 |

Reference numeral 47 indicates the selector which is supplied with a write address upon writing of pixel data into each memory 16-(I, J) and supplied with a read address upon reading of pixel data from each memory 16-(I, J) and which supplies either one of those addresses to each memory 16-(I, J) according to the value of a write/detection switching signal.

Since unillustrated other elements of structure employed in the third embodiment are configured in a manner similar to the second embodiment, their description will be omitted.

The operation will next be explained.

Figure 21:
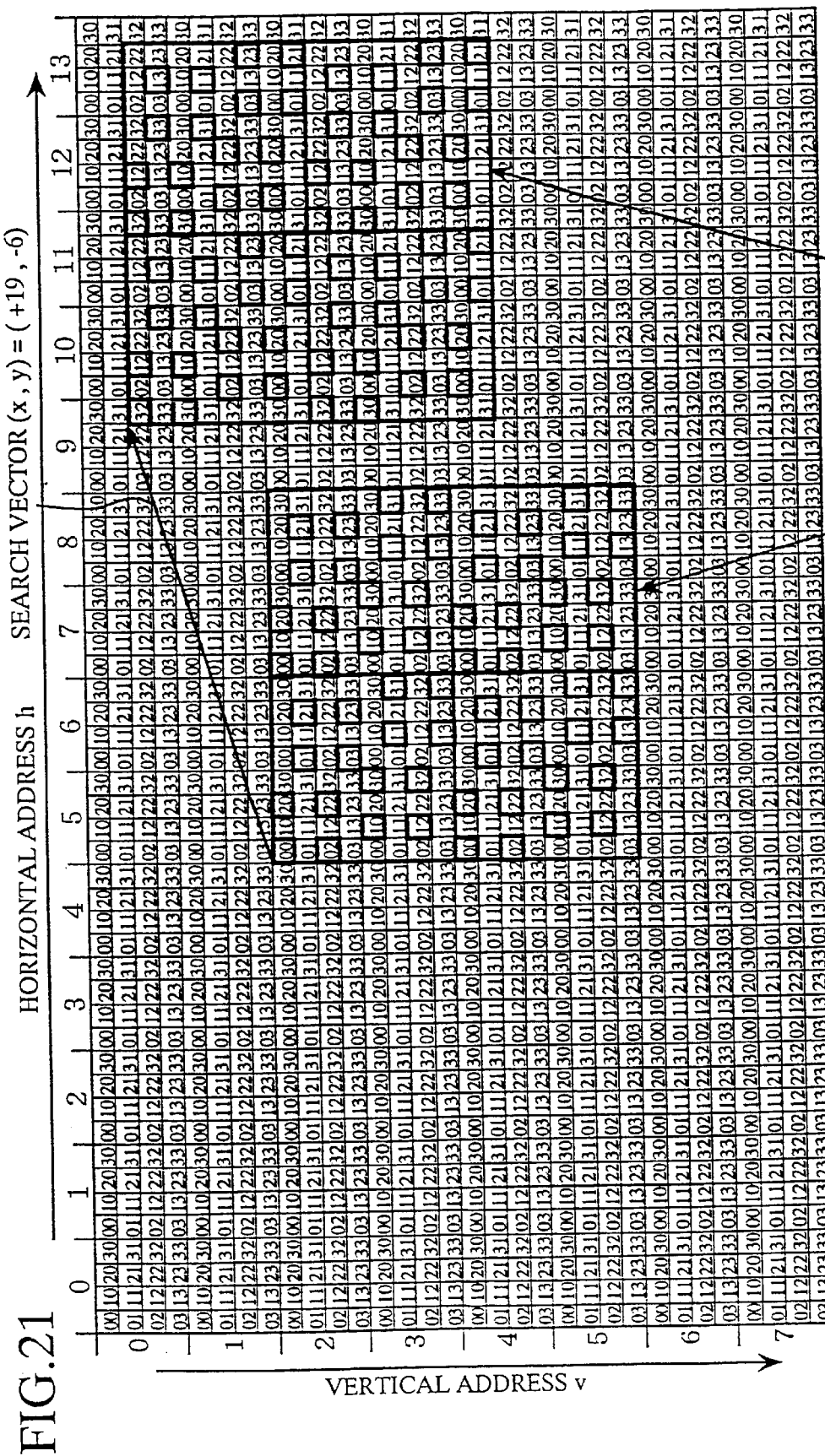
FIG. 21 is a diagram illustrating one example of a search block at the time that pixel data is thinned out to ¼ in a second pattern.
Figure 22:
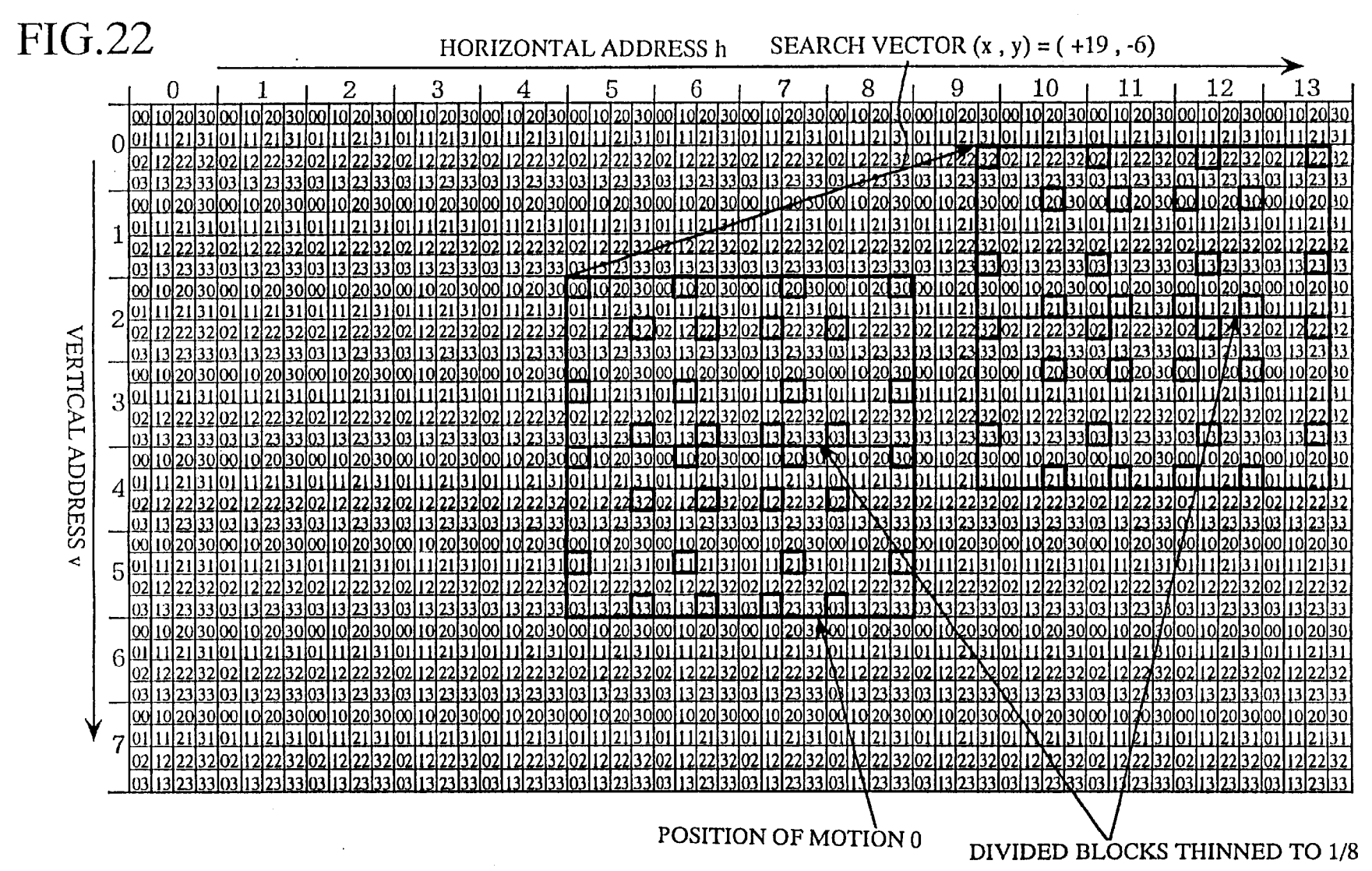
Figure 23:
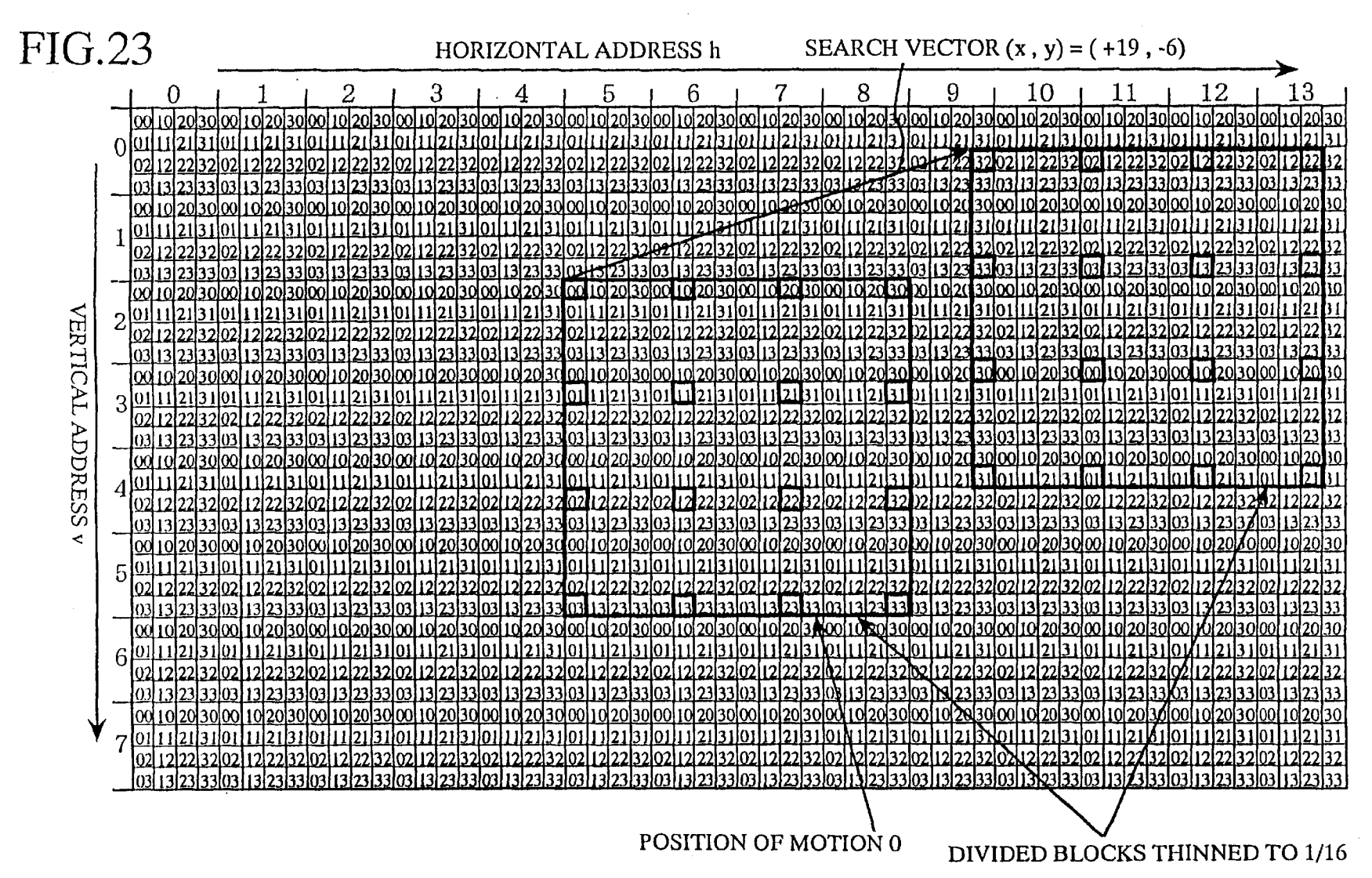

FIG. 20 is a diagram showing one example of a search block at the time that pixel data is thinned out to ½ in a first pattern. FIG. 21 is a diagram illustrating one example of a search block at the time that pixel data is thinned out to ¼ in a second pattern. FIG. 22 is a diagram depicting one example of a search block at the time that pixel data is thinned out to ⅛ in a third pattern. FIG. 23 is a diagram showing one example of a search block at the time that pixel data is thinned out to 1/16 in a fourth pattern.

When the pixel data is thinned to ½ and comparisons between the resultant pixel data are executed, eight divided blocks given in the form of 4 rows and 8 columns are set for a reference block and a search block corresponding to the reference block as shown in FIG. 20. Only the pixel data (corresponding to data about pixels other than blank pixels in FIG. 20) thinned to ½, of pixel data of the respective divided blocks in the search block is compared with the corresponding pixel data in the respective divided blocks in the reference block by an evaluation unit 4A.

Since the present embodiment is similar in other operation to the second embodiment, the description thereof will be omitted.

When the pixel data is thinned to ¼ and comparisons between the resultant pixel data are executed, four divided blocks given in the form of 8 rows and 8 columns are set for a reference block and a search block corresponding to the reference block as shown in FIG. 21. Only the pixel data (corresponding to data about pixels surrounded by thick lines in FIG. 21) thinned to ¼, of pixel data of the respective divided blocks in the search block is compared with the corresponding pixel data in the respective divided blocks in the reference block by the evaluation unit 4A.

When the pixel data is thinned to ⅛ and comparisons between the resultant pixel data are executed, two divided blocks given in the form of 8 rows and 16 columns are set for a reference block and a search block corresponding to the reference block as shown in FIG. 22. Only the pixel data (corresponding to data about pixels surrounded by thick lines in FIG. 22) thinned to ⅛, of pixel data of the respective divided blocks in the search block is compared with the corresponding pixel data in the respective divided blocks in the reference block by the evaluation unit 4A.

When the pixel data is thinned to 1/16 and comparisons between the resultant pixel data are executed, one divided block given in the form of 16 rows and 16 columns is set for a reference block and a search block corresponding to the reference block as shown in FIG. 23 (i.e., the original block is exceptionally set to one divided block). only the pixel data (corresponding to data about pixels surrounded by thick lines in FIG. 23) thinned to 1/16, of pixel data in the search block is compared with the corresponding pixel data in the reference block by the evaluation unit 4A.

Since the output values of the ROMs 65 and 73 are changed by changing the values of the parameters P in the search window memory unit 2A and the reference memory unit 6A, and in its turn the pixel data outputted to the exchange 3A, of the pixel data stored in the memories 11-(I, J) and the pixel data outputted to the evaluation unit 4A, of the pixel data stored in the memories 16-(I, J) are changed, the aforementioned thinning rate can be changed.

According to the third embodiment as described above, an advantageous effect can be obtained in that since the pixel data obtained by thinning the pixel data constituting the reference block at the predetermined rate and in the predetermined pattern and the pixel data thinned at the predetermined rate, of the pixel data of the search block at the position away by the search vector from the position of the reference block in the search window are compared with one another, the number of times that the pixels are compared, is reduced by the thinning rate and the motion vectors relative to all the blocks can be detected with efficiency and in a short time.

Although the size of the reference block is represented in the form of 16 rows and 16 columns in the third embodiment, it is needless to say that a similar apparatus can be implemented even when the reference block is given in another size. Further, a pattern other than the aforementioned pattern may be used even with respect to the thinning pattern.

Fourth Embodiment

Figure 24:
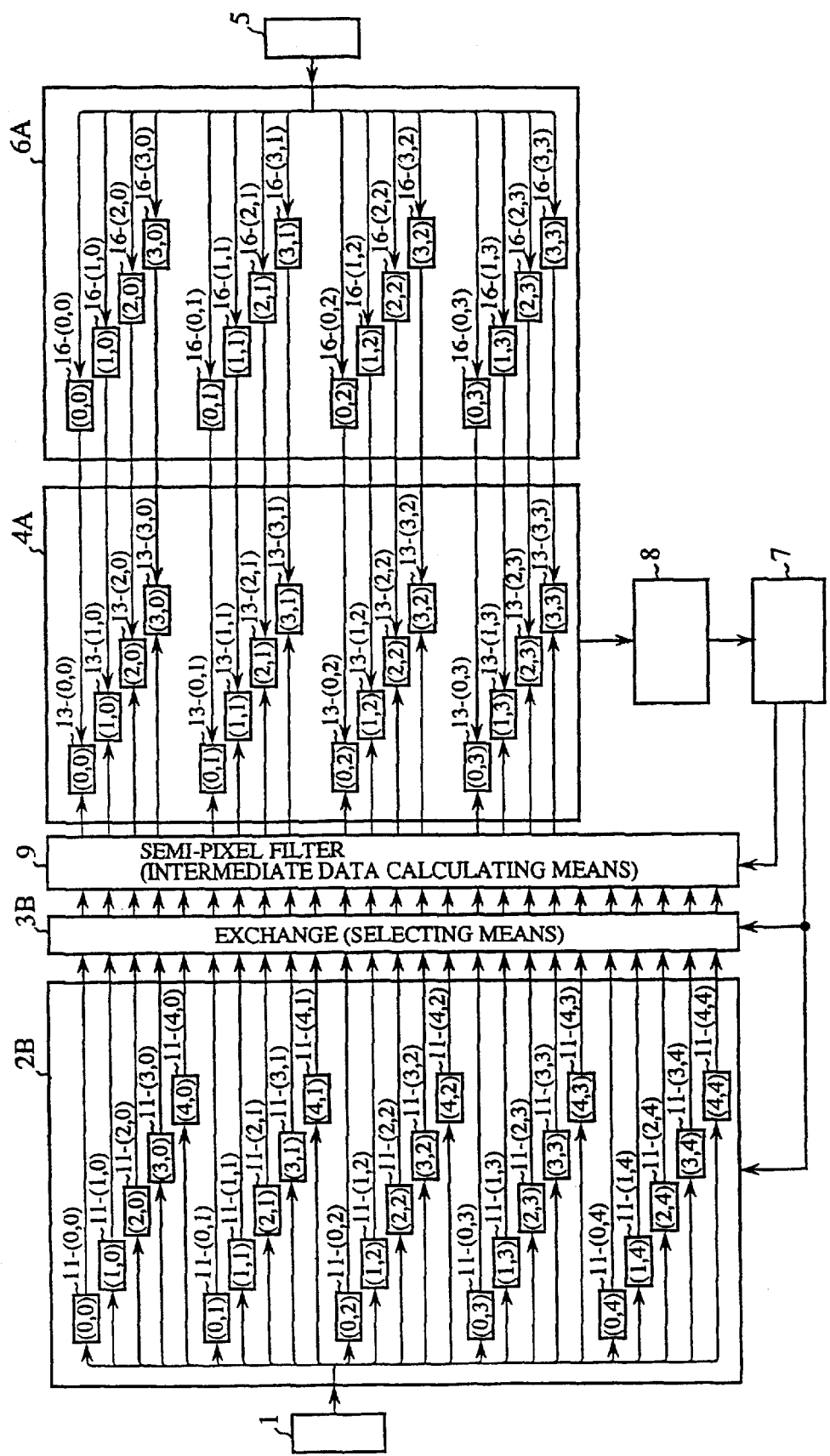
FIG. 24 is a block diagram illustrating a configuration of a motion vector detecting apparatus according to a fourth embodiment of the present invention.
Figure 25:
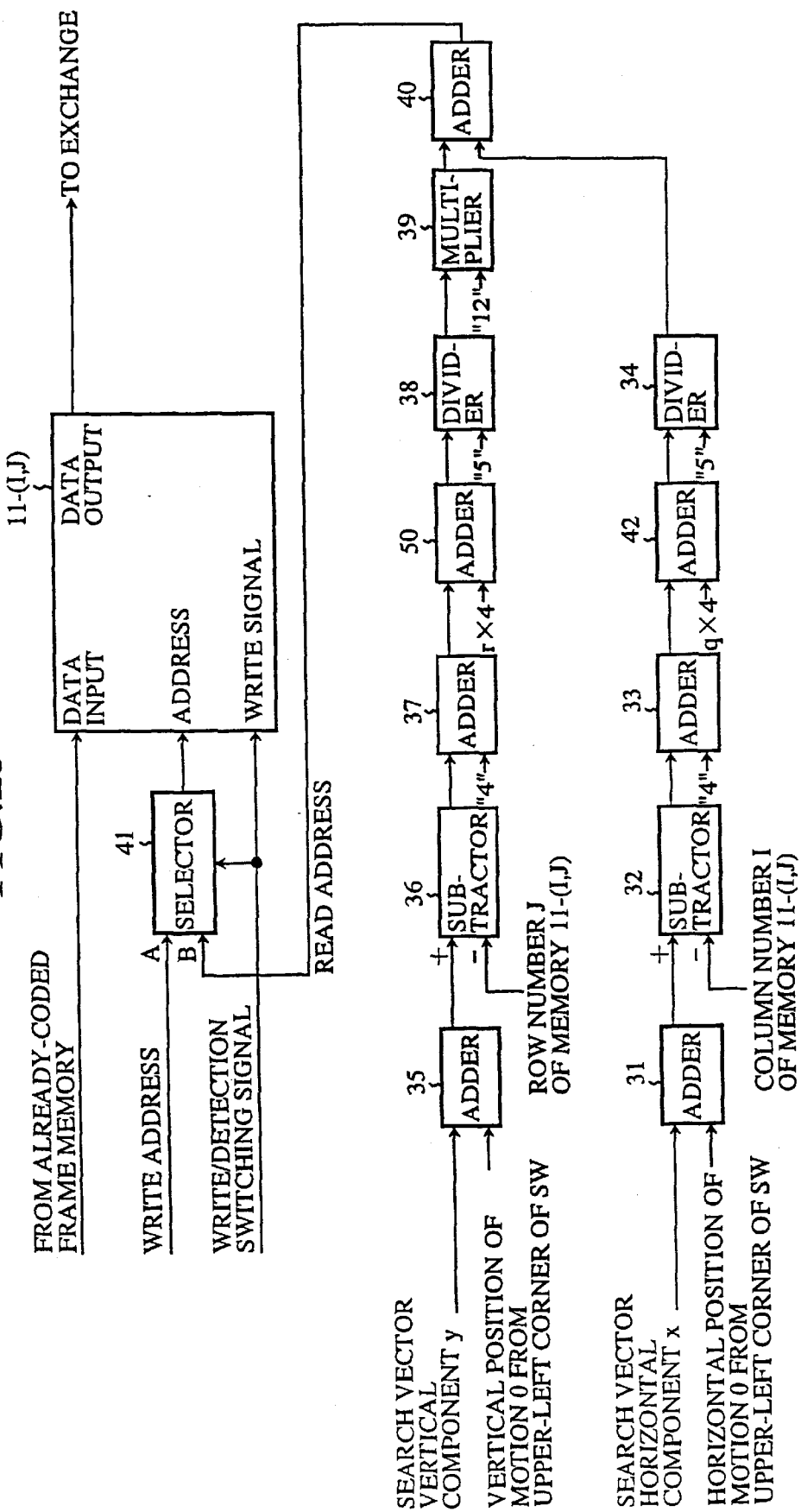
FIG. 25 is a block diagram depicting one example of a circuit for controlling the input/output of each memory of a search window memory unit shown in FIG. 24.
Figure 26:
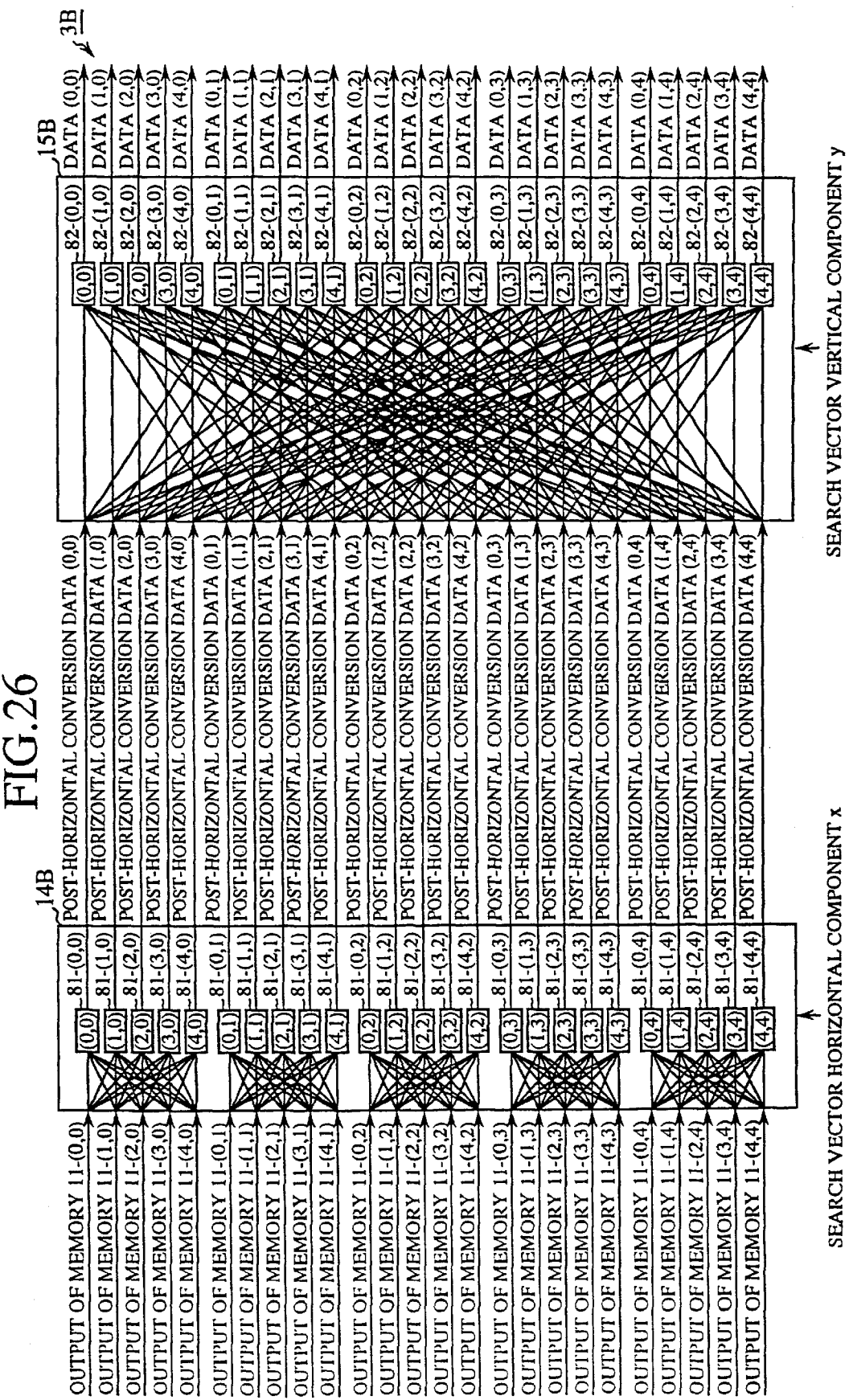
FIG. 26 is a block diagram showing an example of a configuration of an exchange shown in FIG. 24.
Figure 27:
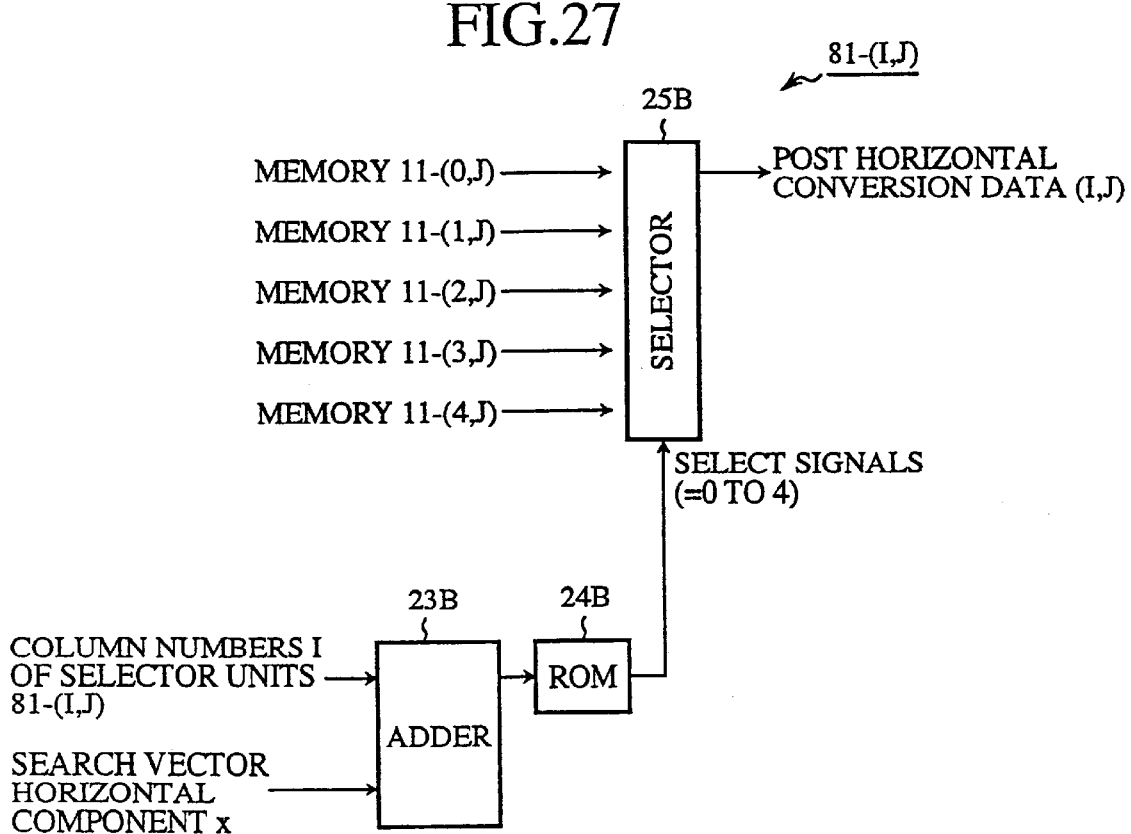
FIG. 27 is a block diagram illustrating an example of a configuration of a selector unit of a horizontal exchanger shown in FIG. 26.
Figure 28:
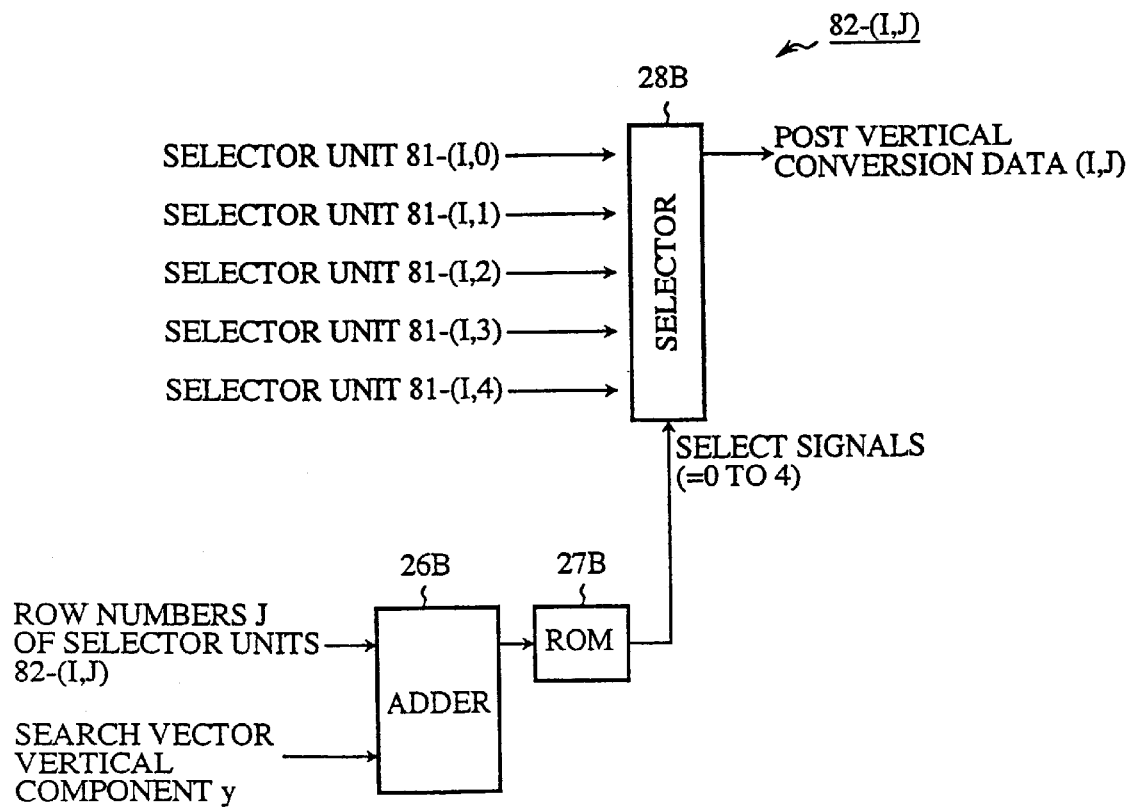
FIG. 28 is a block diagram depicting an example of a configuration of a selector unit of a vertical exchanger shown in FIG. 26.
Figure 29:
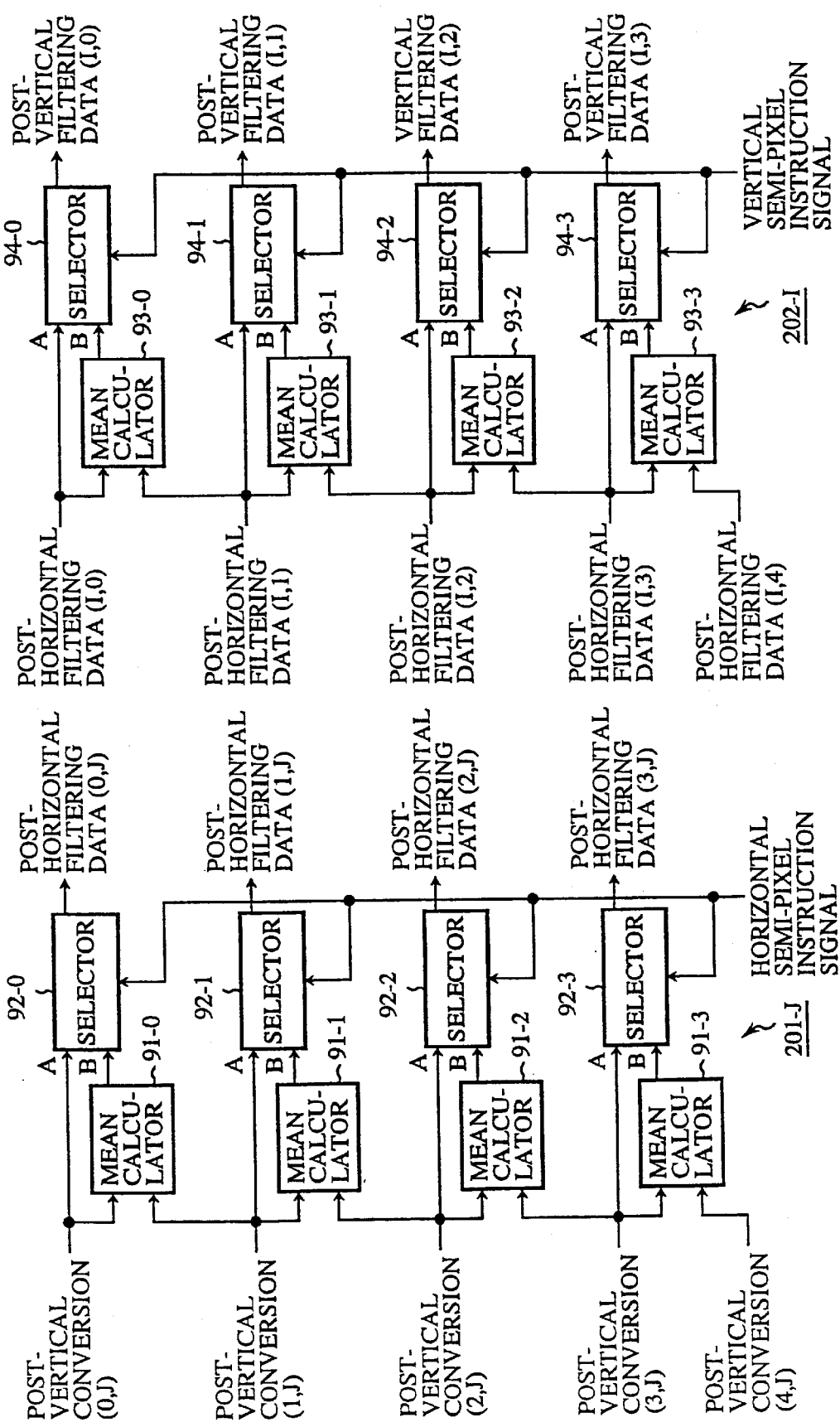
FIGS. 29A and 29B are block diagrams showing examples of a horizontal filter part and a vertical filter part in a semi-pixel filter shown in FIG. 24.

FIG. 24 is a block diagram illustrating a configuration of a motion vector detecting apparatus according to a fourth embodiment of the present invention. FIG. 25 is a block diagram depicting one example of a circuit for controlling the input/output of each memory of a search window memory unit shown in FIG. 24. FIG. 26 is a block diagram showing an example of a configuration of an exchange shown in FIG. 24, FIG. 27 is a block diagram illustrating an example of a configuration of each selector unit of a horizontal exchanger shown in FIG. 26, FIG. 28 is a block diagram depicting an example of a configuration of each selector unit of a vertical exchanger shown in FIG. 26, and FIG. 29 is a block diagram showing examples of a horizontal filter part and a vertical filter part in a semi-pixel filter shown in FIG. 24, respectively.

Incidentally, the motion vector detecting apparatus according to the fourth embodiment is one wherein a reference block is represented in the form of 16 rows and 16 columns and its divided blocks are respectively represented in the form of 4 rows and 4 columns.

In FIG. 24, reference numeral 2B indicates a search window memory unit (coded data storing means, eighth storing means and selecting means) having memories 11-(I, J) for respectively storing pixel data of the same rows I and same columns J in areas each larger than each divided block of the reference block by one row and one column, into which a search window is divided. Namely, the memories 11-(I, J) are provided by the number identical to the number of pixels in the above-described areas.

In FIG. 25, reference numeral 33 indicates an adder for calculating the sum of a value outputted from a subtractor 32 and a constant 4 and outputting the result of calculation therefrom. Reference numeral 34 indicates a divider for outputting an integer portion of a value obtained by dividing an output value of an adder 42 by a constant 5. Reference numeral 37 indicates an adder for calculating the sum of a value outputted from a subtractor 36 and a constant 4 and outputting the result of calculation therefrom. Reference numeral 38 indicates a divider for outputting an integer portion of a value obtained by dividing an output value of an adder 50 by a constant 5. Reference numeral 39 indicates a multiplier for calculating the product of the output value of the divider 38 and a constant 12 and outputting the result of calculation therefrom.

Since other parts in FIG. 25 are similar to those in FIG. 11, their description will be omitted.

Referring back to FIG. 24, reference numeral 3B indicates an exchange (selecting means) which is supplied with pixel data, included in each search divided-block identical in size to each divided block in the reference block and spaced away by a search vector from the position of each divided block in the reference block, of pixel data stored in the memories 11-(0, 0) through 11-(4, 4) of the search window memory unit 2B, and which changes their turns and outputs respective pixel data in the search divided-blocks to a semi-pixel filter 9.

In the exchange 3B shown in FIG. 26, reference numeral 14B indicates a horizontal exchanger which is supplied with pixel data from the memories 11-(0,J) through 11-(4, J) every rows J in the search divided-block, selects respective one pixel data from all the pixel data through built-in selector units 81-(0,J) through 81-(4, J) according to the values of search vector horizontal components and outputs the selected data therefrom. Reference numeral 15B indicates a vertical exchanger which supplies pixel data from the selector units 81-(I, 0) through 81-(I, 4) of the horizontal exchanger 14B to built-in selector units 82-(I, 0) through 82-(I, 4), selects respective one pixel data from all the pixel data through the selector units 82-(I, 0) through 82-(I, 4) according to the values of search vector vertical components and outputs the selected data therefrom.

In each selector unit 81-(I, J) shown in FIG. 27, reference numeral 23B indicates an adder for calculating the sum of a column number I of each selector unit 81-(I, J) and a search vector horizontal component and outputting the result of calculation to a ROM 24B. Reference numeral 24B indicates the ROM for supplying the value of the remainder of 5 to the value outputted from the adder 23B to a selector 25b as each select signal. Reference numeral 25B indicates the selector for selecting values from memories 11-(S, J) according to the values S of the select signals outputted from the ROM 24B and outputting the same therefrom.

In each selector unit 82-(I, J) shown in FIG. 28, reference numeral 26B indicates an adder for calculating the sum of a row number J of each selector unit 82-(I, J) and a search vector vertical component and outputting the result of calculation to a ROM 27B. Reference numeral 27B indicates the ROM for supplying the value of the remainder of 5 to the value outputted from the adder 26B to a selector 28B as each select signal. Reference numeral 28B indicates the selector for selecting values from the selector units 81-(I, S) according to the values S of the select signals outputted from the ROM 27B and outputting the same therefrom.

Referring back to FIG. 24, reference numeral 9 indicates the semi-pixel filter (intermediate data calculating means) which calculates pixel data (i.e., pixel data corresponding to positions shifted in horizontal and vertical directions by 0.5 alone, which will hereinafter be called "semi-pixel data") corresponding to intermediate coordinates between pixels in at least one of the horizontal and vertical directions from pixel data in each divided block given in the form of 5 rows and 5 columns, which is supplied from the exchange 3B, and outputs 4-row and 4-column pixel data on the upper-left side of each supplied divided block to an evaluation unit 4A as they are, or outputs 4-row and 4-column pixel data on the upper side of the semi-pixel data in the horizontal direction to the evaluation unit 4A, or outputs 4-row and 4-column pixel data on the left side of the semi-pixel data in the vertical direction, or outputs 4-row and 4-column pixel data corresponding to the semi-pixel data in the horizontal and vertical directions according to the values of a horizontal semi-pixel instruction signal and a vertical semi-pixel instruction signal.

In FIG. 29, reference numerals 201 -J (where J=0, . . . , 4) each indicates a horizontal filter part which calculates four semi-pixel data with respect to five pixel data in a Jth row, which are supplied from the exchange 3B and which outputs pixel data of 0th to 3rd columns, of the five pixel data in the Jth row supplied from the exchange 3B or outputs the calculated four semi-pixel data according to the value of the horizontal semi-pixel instruction signal. Reference numerals 202-I (where I=0, . . . , 3) each indicates a vertical filter part which is supplied with Ith-column pixel data of four pixel data outputted from the horizontal filter parts 201-0 through 201-4, calculates four semi-pixel data with respect to the supplied Ith-column five pixel data and which outputs pixel data of 0th to 3rd columns, of the supplied Ith-column five pixel data or outputs the calculated four semi-pixel data according to the value of the vertical semi-pixel instruction signal.

In each horizontal filter part 201-J, reference numerals 91-I (where I=0, . . . , 3) each indicates a mean calculator for calculating the mean value of the Ith-column pixel data and (I+1)th-column pixel data of the supplied five pixel data in the Jth row as semi-pixel data. Reference numerals 92-I (where I=0, . . . , 3) each indicates a selector for outputting the Ith-column pixel data of the supplied five pixel data in the Jth row or the semi-pixel data calculated by the mean calculator 91-I according to the value of the horizontal semi-pixel instruction signal.

In each vertical filter part 202-I, reference numerals 93-J (where J=0, . . . , 3) each indicates a mean calculator for calculating the mean value of Jth-row pixel data and (J+1) th-row pixel data of the supplied five pixel data in the Ith row as semi-pixel data. Reference numerals 94-J (where J=0, . . . , 3) each indicates a selector for outputting the Jth-row pixel data of the supplied five pixel data in the Ith row or the semi-pixel data calculated by the mean calculator 93-J according to the value of the vertical semi-pixel instruction signal.

Since other elements of structure are similar to those employed in the second embodiment, their description will be omitted.

The operation will next be described.

Figure 30:
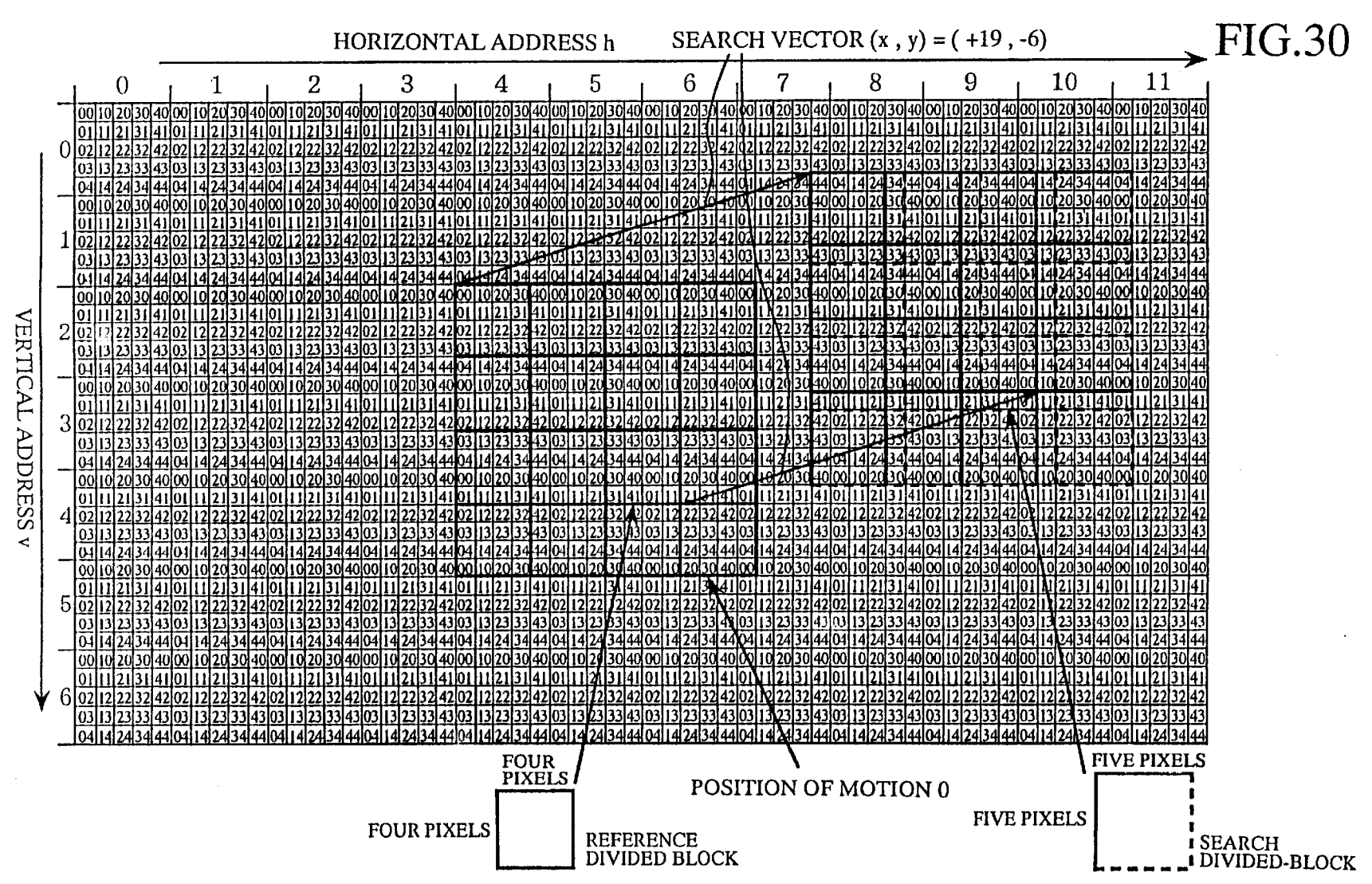

FIG. 30 is a diagram illustrating one example of a search divided-block employed in the fourth embodiment.

Firstly, an already-coded frame memory 1 outputs pixel data of the same row I and same column J in each of areas, each larger than each divided block (4 rows and 4 column in this case) of a reference block by one row and one column, into which a search window is divided, to the corresponding memory 11-(I, J) of the search window memory unit 2B as shown in FIG. 30.

Next, when the searching of a motion vector is executed, a motion vector detection unit 7 supplies a search vector to the search window memory unit 2B and the exchange 3B and suitably supplies a horizontal semi-pixel instruction signal indicative of whether semi-pixel data in a horizontal direction in the search divided-block should be outputted and a vertical semi-pixel instruction signal indicative of whether semi-pixel data in a vertical direction in the search divided-block should be outputted. A block accumulator 8 suitably supplies horizontal and vertical addresses q and r of each divided block to be processed at that time, of the divided blocks to the search window memory unit 2B, exchange 3B and reference memory unit 6A.

In the search window memory unit 2B, a search vector horizontal component is supplied to an adder 31 and a search vector vertical component is supplied to an adder 35. A value set to four times the horizontal address q of each divided block is supplied to the adder 42, and a value set to four times the vertical address r of each divided block is supplied to the adder 50.

Read addresses for the memories 11-(I, J), which correspond to the horizontal and vertical addresses q and r of the supplied search vector and divided blocks, are calculated by the adders 31, 33, 35, 37, 40, 42 and 50, the subtractors 32 and 36, the dividers 34 and 38, and the multiplier 39. The memories 11-(I, J) respectively output the pixel data stored at the supplied read addresses to the selector units 81-(0,J) through 81-(4, J) of the exchange 3B.

Incidentally, when x is defined as the search vector horizontal component, y is defined as the search vector vertical component, SWH0 is defined as a horizontal position of the upper-left corner of the reference block as viewed from the upper-left corner of the search window, and SWV0 is defined as a vertical position of the upper-left corner of the reference block as seen from the upper-left corner of the search window, the read addresses A (I, J) corresponding to the memories 11-(I, J) are calculated by the adders 31, 33, 35, 37 40, 42 and 50, the subtractors 32 and 36, the dividers 34 and 38, and the multiplier 39 in accordance with the following equation:

$$A (1, J)=(int((SWV0+y-J+r\times 4+4))/5))\times 12+int((SWH0 +x-I+q\times 4+4)/5)$$

In the exchange 3B, each of the selector units 81-(I, J) of the horizontal exchanger 14B selects any of the values from the memories 11-(0,J) through 11-(4, J) according to the search vector horizontal component supplied from the motion vector detection unit 7 and outputs the selected value to each of the selector units 82-(I, 0) through 82-(I, 4) of the vertical exchanger 15B.

In each selector unit 81-(I, J) at this time, select signals re calculated based on the column number I of each selector unit 81-(I, J) and the search vector horizontal component by the adder 23B and the ROM 24B and supplied to the selector 25B. A value from each of the memories 11-(SS, J) is outputted according to the value SS of each select signal. Incidentally, the values SS of the select signals are calculated by the adder 23B and the ROM 24B on the basis of the column numbers I of the selector units 81-(I, J) and the search vector horizontal component x in accordance with the following equation:

$$SS=mod(I+x, 5)$$

Thereafter, each of the selector units 82-(I, J) of the vertical exchanger 15B selects any of values from the selector units 81-(I, 0) through 81-(I, 4) according to the search vector vertical component supplied from the motion vector detection unit 7 and outputs the selected value to each horizontal filter part 201-J of the semi-pixel filter 9.

In each selector unit 82-(I, J) at this time, select signals are calculated based on the row number J of each selector unit 82-(I, J) and the search vector vertical component by the adder 26B and the ROM 27B and supplied to the selector 28B. A value from each of the selector units 81-(I, SS) is outputted according to the value SS of each select signal. Incidentally, the values SS of the select signals are calculated by the adder 26B and the ROM 27B on the basis of the row numbers J of the selector units 82-(I, J) and the search vector vertical component y in accordance with the following equation:

$$SS=mod(J+y, 5)$$

In each horizontal filter part 201-J of the semi-pixel filter 9, the means calculators 91-0 through 91-3 respectively calculate four semi-pixel data with respect to Jth-row five pixel data of each divided block, which are supplied from the selector units 82-(0,J) through 82-(4, J). Further, the selectors 92-0 through 92-3 respectively output the four pixel data outputted from the selector units 82-(0,J) through 82-(3, J) or the four semi-pixel data calculated by the mean calculators 91-0 through 91-3 according to the value of a horizontal semi-pixel instruction signal supplied from the motion vector detection unit 7. At this time, the pixel data outputted from the selectors 92-I of the horizontal filter part 201-J are supplied to the mean calculators 93-J and selectors 94-J of the vertical filter part 202-I.

Next, in each vertical filter part 202-I of the semi-pixel filter 9, the mean calculators 93-0 through 93-3 respectively calculate four semi-pixel data with respect to Ith-column five pixel data of each individual divided blocks, which are supplied from the horizontal filter parts 201-0 through 201-4. Further, the selectors 94-0 through 94-3 respectively output four pixel data supplied from the horizontal filter parts 201-0 through 201-4 or the four semi-pixel data calculated by the mean calculators 93-0 through 93-3 according to the value of a vertical semi-pixel instruction signal supplied from the motion vector detection unit 7. At this time, the pixel data outputted from the selectors 94-J of each vertical filter part 202-I are outputted to the pixel comparators 13-(I, J) of the evaluation unit 4A.

On the other hand, a coded frame memory 5 allows each memory 16-(I, J) to store pixel data of any of blocks into which a coded frame is divided, every pixel data of the same row I and same column J in each divided block.

Further, the memories 16-(0, 0) through 16-(3, 3) of he reference memory unit 6A respectively supply pixel data in the divided blocks corresponding to the supplied horizontal and vertical addresses q and r to the pixel comparators 13-(0, 0) through 13-(3, 3) of the evaluation unit 4A for each clock.

At this time, a multiplier 45 and an adder 46 in the reference memory unit 6A calculate a read address (=r×4+q) from the supplied horizontal and vertical addresses q and r and supply it to each of the memories 16-(0, 0) through 16-(3, 3) through a selector 47.

When the pixel data is supplied from the exchange 3B and the reference memory unit 6A respectively, the pixel comparators 13-(I, J) of the evaluation unit 4A respectively calculate the differences between the pixel data from the selector units 52-(I, J) of the exchange 3B and the pixel data from the memories 16-(I, J) of the reference memory unit 6A and supply their differences to the block accumulator 8. When the differences between the pixel data are supplied to the block accumulator 8, it outputs horizontal and vertical addresses q and r for specifying the next divided block. On the other hand, when the differences between the pixel data corresponding to one block are accumulated in the block accumulator 8, it outputs their differences to the motion vector detection unit 7. The motion vector detection unit 7 stores the sum of absolute values of the differences between the pixel data supplied from the evaluation unit 4A therein as an evaluation value in association with a search vector at this time.

The motion vector detection unit 7 supplies a new search vector to the search window memory unit 2B and the exchange 3B, based on a predetermined order or the relationship between the already calculated search vector and evaluation value and supplies a horizontal semi-pixel instruction signal and a vertical semi-pixel instruction signal of predetermined values to the semi-pixel filter 9.

Thus, the motion vector detection unit 7 updates the corresponding search vector until the predetermined order is completed or the evaluation value reaches a predetermined value or less, supplies the horizontal semi-pixel instruction signal and vertical semi-pixel instruction signal of the predetermined values to the semi-pixel filter 9 and searches motion vectors in semi-pixel units to thereby determine a search vector at the time that the evaluation value is minimum, as a motion vector.

According to the fourth embodiment as described above, an advantageous effect can be brought about in that since the pixel data constituting the reference block and the pixel data in the range identical in size to the reference block at the position away by the search vector from the position of the reference block in the search window, or the semi-pixel data corresponding to the pixel data referred to above are compared with one another, the comparison between the pixel data in finer pixel units can be executed.

Although the size of the reference block is represented in the form of 16 rows and 16 columns and each divided block thereof is represented in the form of 4 rows and 4 columns in the fourth embodiment, it is needless to say that a similar apparatus can be implemented even when the reference block and each divided block thereof are given in other sizes. In place of the semi-pixel data, the pixel data may be compared with one another in finer pixel units such as ¼ pixel units.

Fifth Embodiment

Figure 31:
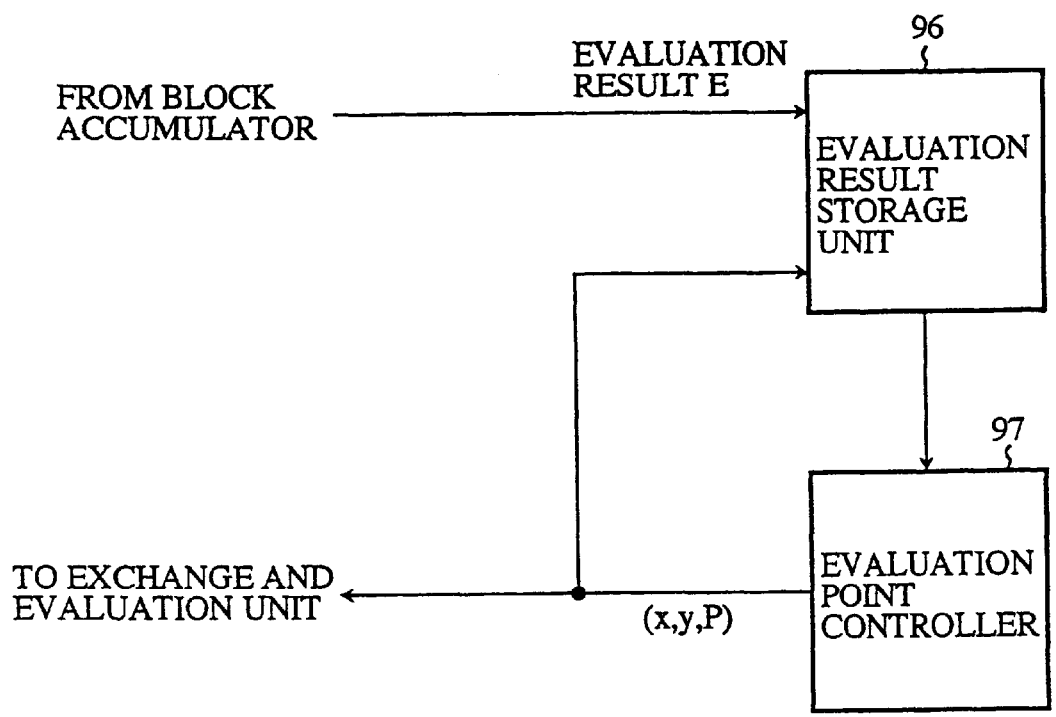
FIG. 31 is a block diagram depicting a configuration of a motion vector detection unit of a motion vector detecting apparatus according to a fifth embodiment of the present invention.

FIG. 31 is a block diagram showing a configuration of a motion ector detection unit of a motion vector detecting apparatus according to a fifth embodiment of the present invention. Other elements of structure unillustrated in the fifth embodiment are similar to those employed in the third embodiment and their description will therefore be omitted.

In FIG. 31, reference numeral 96 indicates an evaluation result storage unit for accumulating the sum of the absolute values of the compared results about the respective pixels in each individual divided blocks supplied from the block accumulator 8 as an evaluation result in association with the search vector and the value of the parameter P at that time. Reference numeral 97 indicates an evaluation point controller for reading the past evaluation result stored in the evaluation result storage unit 96, calculating the next search vector and the aforementioned thinning pattern (i.e., the value of the parameter P) in accordance with a predetermined algorithm so as to lower an evaluation value, and outputting those values to the exchange 3A and the evaluation unit 4A.

The operation will next be described.

Figure 32:
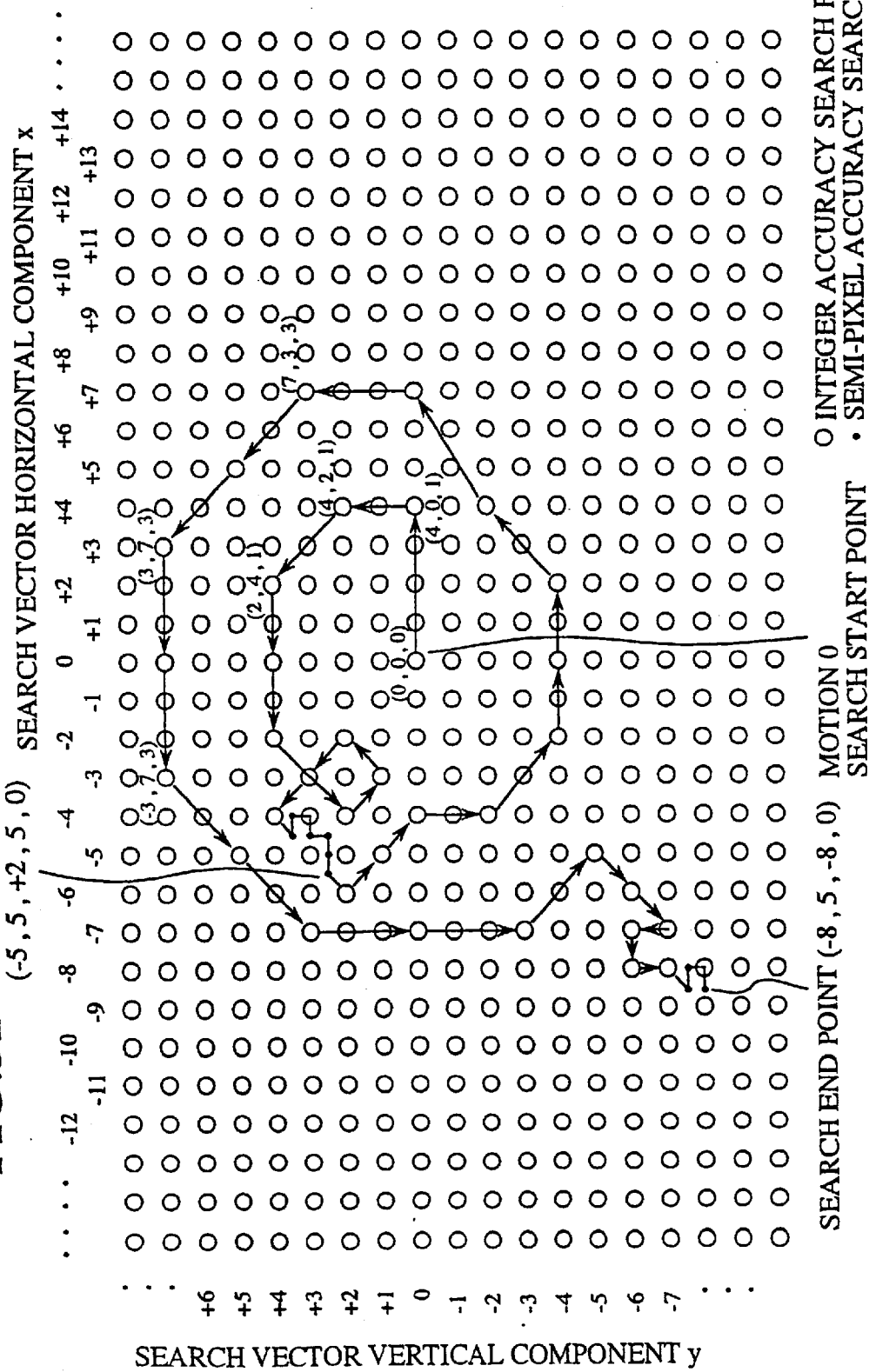
FIG. 32 is a diagram showing one example of a history of search vectors and values of parameters P at the time that motion vectors are searched by the motion vector detecting apparatus according to the fifth embodiment of the present invention.
Figure 33:
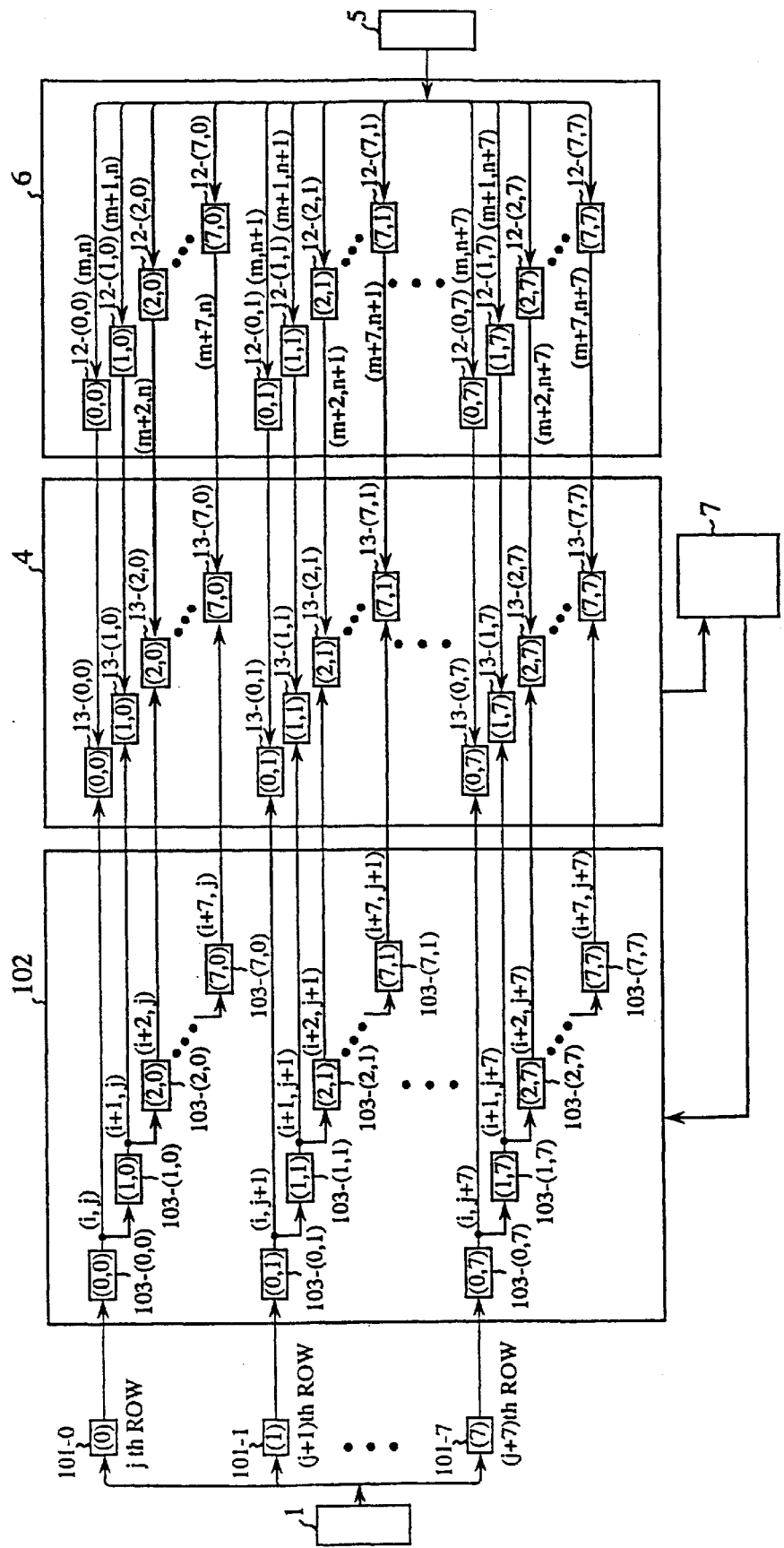
FIG. 33 is a block diagram illustrating a motion vector detecting apparatus according to a conventional example 1.

FIG. 32 is a diagram showing one example of a history of search vectors and values of parameters P at the time that motion vectors are searched by the motion vector detecting apparatus according to the fifth embodiment.

In the motion vector detecting apparatus according to the fifth embodiment, the evaluation result storage unit 96 accumulates the sum of the absolute values of the compared results about the respective pixels in each individual divided blocks as the valuation result in association with the search vector and the value of the parameter P at that time. The evaluation point controller 97 reads the past evaluation results stored in the evaluation result storage unit 96, calculates the next search vector and the aforementioned thinning pattern in accordance with the predetermined algorithm, and outputs those values to the search window memory unit 2B, the exchange 3B and the evaluation unit 4A.

Since the fifth embodiment is similar in other operation to the third embodiment, the description thereof will be omitted.

Thus, the search vectors and the thinning pattern are successively determined so as to lower the evaluation value as shown in FIG. 32 by way example until predetermined stop conditions are established in accordance with a predetermined algorithm on the basis of the past evaluation results. When the search vector and the parameter are defined as (x, y) and P in FIG. 32 respectively, the processing is first started in a state of (x, y, P)=(0, 0, 0). Thereafter, the search vector (x, y) and the parameter P are successively changed. Finally, the processing is terminated in a state of (x, y, P) (−8.5, −8, 0). Accordingly, a motion vector at this time is given by (−8.5, −8).

According to the fifth embodiment as described above, an advantageous effect can be obtained in that since the values of the search vector and the like are determined in accordance with the predetermined algorithm according to the result of comparison by the evaluation unit 4A, the corresponding motion vector can be more efficiently detected within the search window.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A motion vector detecting apparatus for detecting a motion vector relative to an already-coded frame for each of individual blocks into which a frame of image data is divided, comprising:

block data storing means for storing pixel data about a number of pixels, pixel data about pixels constituting the blocks;

coded data storing means for storing pixel data about pixels lying within a range of rows and of columns in the already-coded frame, as viewed from each of the blocks;

selecting means, supplied with a search vector, for selecting pixel data about pixels lying in a range identical in size to each block, at a position spaced from the block in response to the search vector, from the pixel data stored in said coded data storing means;

means for comparing the pixel data stored in said block data storing means and the pixel data selected by said selecting means; and means for detecting a motion vector based on a comparison by said comparing means.

2. The motion vector detecting apparatus according to claim 1, further comprising means for setting a search vector according to the comparison by said comparing means.

3. A motion vector detecting apparatus for detecting a motion vector relative to an already-coded frame for each of individual blocks into which a frame of image data is divided, comprising:

first storing means for storing pixel data about pixels constituting the blocks;

second storing means for, when a range of the already-coded frame is divided into areas identical in size to each block, storing pixel data about pixels in the range of the already-coded frame, all pixel data relating to pixels lying in the same rows and same columns in the divided areas;

selecting means, supplied with a search vector, for respectively selecting any of the pixel data relating to the pixels lying in the same rows and same columns in the divided areas, the data being stored in said second storing means, and selecting pixel data relating to pixels lying in a range identical in size to each block, at a position spaced from each block, in response to the search vector;

means for comparing the pixel data stored in said first storing means and the pixel selected by said selecting means for every pixel; and means for detecting the motion vector based on the comparison by said comparing means.

4. The motion vector detecting apparatus according to claim 3, wherein said first storing means includes third storing means for storing data about pixels constituting blocks, obtained by dividing each block, and said selecting means selects the pixel data about the pixels in a range identical in size to each block.

5. The motion vector detecting apparatus according to claim 3, wherein said first storing means includes third storing means for storing data about pixels constituting each block, each block being thinned at a rate, and said selecting means selects the pixel data about the pixels thinned at the rate from the data about pixels.

6. The motion vector detecting apparatus according to claim 3, further comprising intermediate data calculating means for calculating pixel data lying midway between respective pixels selected by said selected means, based on the pixel data about the selected pixels.

7. The motion vector detecting apparatus according to claim 3, further comprising means for setting a search vector according to the comparison by said comparing means.

* * * * *